(12) United States Patent
Patel et al.

(10) Patent No.: US 11,089,133 B1
(45) Date of Patent: Aug. 10, 2021

(54) SYNCHRONIZING DATA WITH DELAYED SUBSCRIPTIONS

(71) Applicant: Amazon Technologies, Inc., Seattle, WA (US)

(72) Inventors: Amit Patel, Fall City, WA (US); Rohan Deshpande, Seattle, WA (US); Lisa Meenhee Shon, Seattle, WA (US); Karthik Saligrama Shreeram, Seattle, WA (US); Christopher Nathan Dowling, Seattle, WA (US); Jeffrey H. Bailey, Seattle, WA (US); Antoine Francois Charles Boyer, Seattle, WA (US); Richard Threlkeld, New York, NY (US); Michael Paris, Seattle, WA (US); Michael B. Willingham, Seattle, WA (US); Mohit Srivastava, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 603 days.

(21) Appl. No.: 15/821,690

(22) Filed: Nov. 22, 2017

(51) Int. Cl.
| | |
|---|---|
| *G06F 15/16* | (2006.01) |
| *H04L 29/08* | (2006.01) |
| *H04L 29/06* | (2006.01) |
| *G06F 16/27* | (2019.01) |

(52) U.S. Cl.
CPC .......... *H04L 67/325* (2013.01); *G06F 16/273* (2019.01); *H04L 67/2809* (2013.01); *H04L 67/2895* (2013.01); *H04L 67/42* (2013.01)

(58) Field of Classification Search
CPC ............... H04L 67/325; H04L 67/2809; H04L 67/2895; H04L 67/42; G06F 16/273
See application file for complete search history.

(56) References Cited

U.S. PATENT DOCUMENTS

| | | | |
|---|---|---|---|
| 8,645,429 B1 | 2/2014 | Bik et al. | |
| 9,509,529 B1 * | 11/2016 | McAllister | .............. H04L 51/26 |
| 9,531,677 B1 | 12/2016 | Rodgers et al. | |
| 2003/0004882 A1 * | 1/2003 | Holler | ................... G06F 21/121 |
| | | | 705/51 |
| 2008/0168072 A1 | 7/2008 | Freedman | |
| 2009/0327292 A1 | 12/2009 | Janssen et al. | |
| 2010/0281154 A1 | 11/2010 | Bedi et al. | |
| 2011/0145187 A1 | 6/2011 | Himmelsbach et al. | |
| 2011/0265164 A1 | 10/2011 | Lucovsky et al. | |
| 2011/0289172 A1 | 11/2011 | Marcellino | |
| 2013/0054514 A1 * | 2/2013 | Barrett-Kahn | ...... G06F 16/9574 |
| | | | 707/608 |
| 2013/0144954 A1 | 6/2013 | Li et al. | |
| 2013/0159377 A1 | 6/2013 | Nash | |
| 2014/0047040 A1 | 2/2014 | Patiejunas et al. | |
| 2014/0310819 A1 | 10/2014 | Cakarel et al. | |
| 2015/0370844 A1 | 12/2015 | Chen et al. | |

(Continued)

*Primary Examiner* — Normin Abedin
(74) *Attorney, Agent, or Firm* — Nicholson De Vos Webster & Elliott LLP

(57) ABSTRACT

A technology is provided for synchronizing data with delayed subscriptions. A request may be received at a data proxy for a data snapshot for an application that has been offline at the client. A subscription may be held for a pre-determined amount of time after the request for the snapshot. The data snapshot may be sent to the client. The data for the subscription may be sent after the pre-determined amount of time.

20 Claims, 17 Drawing Sheets

(56) References Cited

U.S. PATENT DOCUMENTS

2016/0328429 A1 11/2016 Lipcon
2017/0099347 A1 4/2017 Pucha et al.
2017/0193611 A1 7/2017 Vassilev et al.
2017/0344596 A1 11/2017 Fuller et al.
2018/0307546 A1 10/2018 Aston \* cited by examiner

600

```
┌─────────────────────────────────────────────────────────────┐
│ Receiving a mutation at a data proxy from an application   │── 610
│ executing at a client, wherein the data proxy hosted by a  │
│ service provider environment.                               │
└─────────────────────────────────────────────────────────────┘
                              │
                              ▼
┌─────────────────────────────────────────────────────────────┐
│ Sending the mutation to a data access resolver to enable   │── 620
│ the mutation to be processed by a data store.              │
└─────────────────────────────────────────────────────────────┘
                              │
                              ▼
┌─────────────────────────────────────────────────────────────┐
│ Receiving a conflict message at the data proxy from the    │── 630
│ data access resolver for a conflict mutation via the data  │
│ store.                                                      │
└─────────────────────────────────────────────────────────────┘
                              │
                              ▼
┌─────────────────────────────────────────────────────────────┐
│ Resolving the conflict at the data proxy using a conflict  │── 640
│ resolution function initiated by the data proxy.           │
└─────────────────────────────────────────────────────────────┘
                              │
                              ▼
┌─────────────────────────────────────────────────────────────┐
│ Determining whether to apply the mutation to the data      │── 650
│ store via a data access resolver associated with the data  │
│ proxy after the conflict has been resolved.                │
└─────────────────────────────────────────────────────────────┘
```

```
┌─────────────────────────────────────────────────────────────┐
│ Accepting a network connection from a client at a data proxy, wherein the │ ~ 1310
│ data proxy is hosted by a service provider environment, and wherein the │
│ client was previously connected to the data proxy.          │
└─────────────────────────────────────────────────────────────┘
                              │
                              ▼
┌─────────────────────────────────────────────────────────────┐
│ Receiving a request at a data proxy for a data snapshot for an application that │ ~ 1320
│ was offline at the client, wherein the data snapshot includes data generated │
│ while the client device was offline.                        │
└─────────────────────────────────────────────────────────────┘
                              │
                              ▼
┌─────────────────────────────────────────────────────────────┐
│ Holding a subscription for update data for a pre-determined amount of time │ ~ 1330
│ after the request for the snapshot, wherein data for the subscription is │
│ generated after the network connection has been made.       │
└─────────────────────────────────────────────────────────────┘
                              │
                              ▼
┌─────────────────────────────────────────────────────────────┐
│ Sending the data snapshot to the client device.             │ ~ 1340
└─────────────────────────────────────────────────────────────┘
                              │
                              ▼
┌─────────────────────────────────────────────────────────────┐
│ Sending data for the subscription after the pre-determined amount of time. │ ~ 1350
└─────────────────────────────────────────────────────────────┘
```

```
┌─────────────────────────────────────────────────────────────────┐
│ Receiving a request at a data proxy for a data snapshot for an  │── 1410
│ application that has been offline at the client.                │
└─────────────────────────────────────────────────────────────────┘
                                │
                                ▼
┌─────────────────────────────────────────────────────────────────┐
│ Holding a subscription for a pre-determined amount of time      │── 1420
│ after the request for the snapshot.                             │
└─────────────────────────────────────────────────────────────────┘
                                │
                                ▼
┌─────────────────────────────────────────────────────────────────┐
│ Sending the data snapshot to the client.                        │── 1430
└─────────────────────────────────────────────────────────────────┘
                                │
                                ▼
┌─────────────────────────────────────────────────────────────────┐
│ Sending data for the subscription to the client via an          │── 1440
│ associated topic for a messaging service after the              │
│ pre-determined amount of time.                                  │
└─────────────────────────────────────────────────────────────────┘
```

FIG. 14

SYNCHRONIZING DATA WITH DELAYED SUBSCRIPTIONS

BACKGROUND

Electronic devices have become ever-present in many aspects of modern society. During the course of a normal day, many people may use a smart phone, a tablet device, a laptop computer, a desktop computer and other computing devices. Mobile devices have also become widely used whether for personal use, business use, or institutional use. In addition, retail businesses, airlines, marketers, restaurants, schools and others may use mobile devices to make their businesses run more smoothly.

Advancements in communication technologies have allowed mobile devices and other client type devices to communicate with other devices and centralized computing systems over a computer network. Such devices may obtain benefits from frequent networking communication with centralized computing services, centralized data services, or other computing support systems. For example, electronic devices in a point-of-sale system in a pop-up store may have intermittent internet connectivity but may need access to synchronize store inventory and purchase records with a centralized computing service.

Mobile devices, non-mobile clients, and the applications that execute on computing devices may be connected to a service provider environment that provides centralized computing services and virtual computing options in order to provide network enabled applications, centralized data access and other functions available from a centralized computing service hosted in a service provider environment. Applications designed for this environment may be more effective when the applications are able to share information and receive data updates effectively.

BRIEF DESCRIPTION OF THE DRAWINGS

FIGS. 6-8 are flowcharts illustrating an example of a method for conflict resolution for a mutation according to an example of the present technology.

FIGS. 13-14 are flowcharts illustrating an example of a method for synchronizing data with delayed subscription delivery according to an example of the present technology.

DETAILED DESCRIPTION

Figure 1:
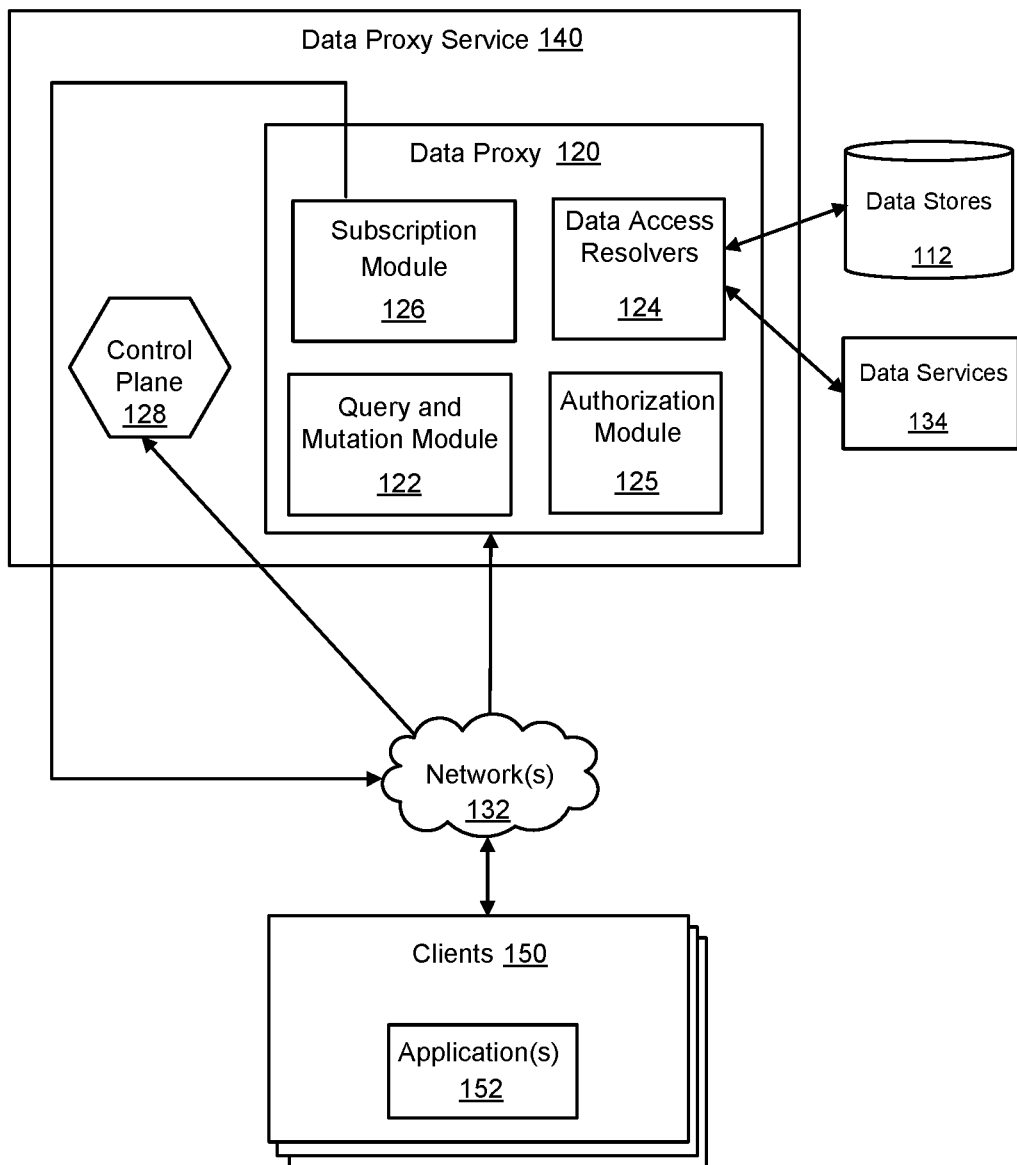
FIG. 1 is a block diagram illustrating a data proxy service according to embodiments of the present technology.

Technologies are described that may provide collaborative applications across interconnected browsers, mobile apps, non-mobile devices, and other platforms (e.g., other operating systems or application service platforms) that provide a high degree of data synchronization and remain usable when network connectivity is lost. Using a data proxy service, applications may be provided that include disconnected data access (e.g., for field service apps and point of sale systems), multi-user shared electronic spaces (e.g., for electronic chatrooms, electronic whiteboards, games, and AR/VR (augmented reality/virtual reality) environments), multi-device UX (e.g., for shared spaces accessible from a voice activated service, mobile apps, etc.), and real-time resource tracking (e.g., for smart electricity meters and transportation fleets). The data proxy service may enable immediate synchronization of application data across multiple clients, multiple devices and multiple authenticated users. The application may improve the overall application experience by configuring or selecting which data is synchronized to each client, device, or each authenticated application.

The data proxy service may provide applications with an offline oriented programming model that may allow mobile devices, IoT (Internet of Things) devices, and non-mobile devices to interact with data exchanged between multiple devices using Plain Old Class Objects (POCOs), which may also be used for storing local device data. For the applications on the devices, client libraries may enable the performance of optimistic caching and synchronization in response to network conditions, and the client libraries may also be used in making appropriate service interactions based on the data type (e.g., storing files, images, and video in an object data store).

In the data proxy, each field in a query may be mapped to or "resolved" to different data sources. Since the default resolver may be a built-in resolver using a key-value data store and an object data store in a service provider environment, an application may be developed with little to no backend configuration. For more complex use cases, resolvers may be provided for code functions executing in code function services and other services accessible within a service provider environment. These customizable resolvers may enable customized queries to be handled and may enable the integration of additional data stores and data sources.

Subscriptions to data modifications may be created using the data proxy service's underlying query language to selectively synchronize data desired for a particular device, which may minimize device storage and bandwidth consumption for an application and device. The data proxy service may allow a default data storage option to be chosen for application data and the default data storage option may enable data storage in a service provider environment. For example, access to a key-value data store (for data objects) and an object data store (for files) with search service access for rich search queries may be a default configuration data storage in a service provider environment for the data proxy service.

In addition, the data proxy service may enable custom data sources to be integrated into an application via code functions executing on a code function service or services accessible via HTTP endpoints. The data proxy service may transparently handle: synchronization between multiple data sources (e.g., data stores, data services, other services, code functions or service API calls), applications on subscribed devices via network connections (e.g., WebSockets), and subscriptions using publication topics in a publish-subscribe messaging service.

The technology may provide immediate feedback for mutations (e.g., writes for data fields in the mutations). A mutation may be received at a data proxy from an application on a client or device. The mutation may be sent to a data store via a data access resolver associated with the data proxy. Results of the mutation (e.g., confirmations of the written fields) may be received from the data store, and a subscription may be triggered that is correlated to fields received in the results of the mutation. The subscriptions triggered may have fields that match one or more mutation result fields. A message containing updated object data received in the mutation results may be sent to a client. The message may be sent via a topic associated with the subscription by using a messaging service that publishes the message with the mutation to clients subscribed to the topic associated with a subscription.

A subscription fan out process may also be used in the data proxy. The data proxy may receive the results of mutations and determine the relevant subscriptions and topics to which data update messages may be published using a messaging service. The data proxy may identify subscriptions that match combinations of fields in the results for the mutation. The number of combinations of fields in the results for the mutation is $2^N$ where N is the number of inputs representing fields in the results. The messaging for a plurality of subscriptions may be horizontally scalable because subscriptions are triggered that match the combination of fields for mutation results and this subscription matching avoids executing every query in the application to update the application.

Synchronizing data with a client that has previously been offline (e.g., is not connected to the internet or a network for a period of time) may occur using delayed subscriptions for data updates with the data proxy. For example, the client may go offline and then come back online. Once back online, the client re-establishes a connection with the data proxy and requests a data snapshot from the data proxy. The data snapshot may be a current state of the data for the client (e.g., captured at the data proxy using client queries). The data proxy may delay or hold the subscription data that includes new data updates for the period of time since the connection was established to give the client time to process the data snapshot. After the period of time, the subscriptions are sent to the client. This prevents the client from receiving new subscription data created during the connection and update period before processing the snapshot data the client might have otherwise received while offline.

To reconcile conflicting updates to the same data, the data proxy may provide built-in and customizable ways to automatically resolve such conflicts. In one configuration, the data proxy may be used for resolving conflicts for mutations received from a client that are to be applied to a data store. A mutation received from a client by the data proxy may be sent to the data store using a data access resolver. If a conflict message is received from a data store by the data proxy, then the data proxy controls the resolution of the conflict. The data proxy may reject the mutation and optionally notify the client of the rejection. Alternatively, the data proxy may employ a code function to allow a client to receive an option to resolve the conflict. For example, an option may be selected as to which data identified in the conflict may be written to the data store.

FIG. 1 illustrates technologies and systems to provide network enabled applications that may operate effectively when an application is online or offline with respect to a computer network (e.g., the internet). Using these technologies may enable the application to selectively synchronize the application data across multiple devices and multiple users.

A data proxy 120 may be launched in order to provide data, communication, and security services to clients 150 executing applications 152. A graphical console hosted in control plane 128 may be accessed for launching, managing, and stopping the data proxy 120 and other resources. The data proxy 120 may be hosted within a data proxy service 140, and a service provider environment or a server may the host of the data proxy service. For example, the data proxy 120 may be executing on a computing instance that is hosted by a hypervisor in the service provider environment or the data proxy may be hosted directly on a hardware server.

The data proxy 120 may contain a data plane to process and manage data and data requests from the clients 150. The clients 150 may include client libraries that provide the ability to access capabilities of the data proxy 120, and the client libraries may provide offline application capabilities by using optimistic query caching, a mutation queue, and data reconciliation of updates via subscriptions. The clients 150 may be a device such as a mobile device, a non-mobile device (e.g., a desktop or workstation), or a virtual client in another server or a computing instance.

A query and mutation module 122 may execute queries and mutations received as requests from an application 152 on a client 150. In addition, a subscription module 126 may publish messages or notifications to clients 150 when mutations complete. A mutation may be a modification to data in a data source. The data source may be a data store, a data service, other service, or a code function. Subscriptions may execute in the subscription module 126 of the data proxy 120. The subscriptions may deliver updates from the data proxy 120 to the clients 150. The messages sent out in response to triggering a subscription may contain the updated data from the results of a mutation.

The data proxy 120 may also include and enable access to data access resolvers 124. The data access resolvers 124 are functions that map fields from a query or mutation from a domain specific language (DSL) to functions or an operation (e.g., an API call) that may be sent to and used by data stores 112 or data services 134. The data stores 112 or data services 134 may be hosted in a service provider environment or the data access resolver 124 may communicate with a third party data store or service (e.g., a third party as compared to the service provider that manages and maintains the service provider environment).

Examples of data stores 112 that may be accessed through the data access resolvers may be a key-value data store, an object data store, a relational data store, a data warehouse or other data stores. Another example of a data store 112 may be a search service that executes a search against an aggregation of searchable items and returns a result from the search service. Examples of such search services may be ElasticSearch or Apache Solr.

One example data service that may be accessible to the data access resolvers 124 may be a code function service that calls a code function for a data field which is being read or written. The code function may take arguments from a data operation (e.g., a query or mutation) and pass the arguments on to a data store as a second query. The code function may also execute further transformations on the query parameters or query results as the data passes through the code function.

A code function may be a function that launches in a container on a computing instance in the service provider environment and is a segment of program code that is capable of receiving parameters, performing processing, and returning values. In addition, the code function is terminated at the computing instance once the code function returns values.

The data proxy may be employed to handle or manage permissions or authorizations for queries, mutations and events received from clients. The data proxy 120 may include an authorization module 125 to manage the authorizations. For example, a per session identity and permission lists may be employed by the authorization module 125 to manage multiple users accessing the data proxy where the multiple users access the data using different clients. The authorization module 125 may have permission lists or cross account permissions that are stored in a pool or pools to enable authorization of operations. When the data proxy 120 receives a query, mutation or other event from a client, the authorization module 125 may check the permissions or pool to determine if the client, or user account, making the query is authorized to receive the results or apply a mutation. The data proxy may approve deny the operations based on the permissions or may scrub or block a portion of the results that the client is not authorized to receive.

The data proxy 120 may execute a domain specific language (DSL) that includes the ability to query data and handle server events. One example DSL that may be used is GraphQL. In addition, the data proxy 120 may provide conflict handling, as discussed in more detail later.

In a more specific example of the operation of the technology, a web console or command line interface (CLI) may be used to create a data proxy in a geographical region of a service provider environment. The data proxy may auto-load a schema from a file containing the schema as previously defined by a developer. A schema may refer to an organization or structure for object types, queries and mutations that describes the object types and operations for accessing the object types. The object types may contain fields that are scalar types, enumerated types, and other fields. The schema may define the fields in the object and relationships for interacting with the data in the fields of the objects.

When an application 152 on a client 150 interacts with data via instructions received from a user interface, changes may be written to a local cache and then synchronized with the service provider environment (e.g., cloud service) via the data proxy 120. Subsequent changes to this data originating from another device or application transparently flow to the local cache using subscriptions to changes to the data and publication topics associated with the subscriptions. The data proxy service may result in a "data-driven UX" where the UX is automatically refreshed in response to state changes across multiple devices and users. The applications may further use queries, mutations, and subscriptions by making requests sent via client libraries (e.g., Apollo or React). Applications may control access by authenticating devices and users at the data proxy using a preferred identity provider and by specifying access control rules on data and queries managed by the data query.

This technology may allow an application developer to build a new mobile application. A request may be made to the control plane 128 in the data proxy service 140 to launch or activate a data proxy 120 and a data store 112. Then the URL for the data proxy 120 may be added to a client side build configuration. The developer may build a user interface (e.g., using the React framework) and then create a schema file. This schema file may contain the application domain-specific types and data sources. A build process or build environment may then be accessed through the control plane 128 to submit the schema to the data proxy service 140 via a command line interface (CLI), which updates the data proxy 120. The developer may immediately query the data by using the console or by executing queries.

In a further example of data source integration, an application developer may also manage a legacy SOAP (simple object access protocol) service that uses a relational database as the data store. An application be enhanced to read data from key-value data store. Thus, the data proxy 120 may be configured to access both the SOAP service and key-value data store through an individual query or mutation so that data on the data proxy 120 may be aggregated and return a combined data payload to the application. The developer may provision a data proxy 120 using the CLI to manage the data proxy service 140 but the developer may stop the data proxy service from creating a new key-value data store or table, and the developer may connect to a key-value data store that was previously created. This configuration may be written to a schema file in the application project files, and then the configuration may be published. The application may immediately query data coming from both the SOAP service and key-value data store from the application.

Querying

The ability of the data proxy 120 to selectively synchronize data may use the domain-specific language (DSL) that includes concepts for querying the data, mutating the data, subscribing to events, and handling server events. An application query language may be used with the data proxy 120 that allows an application developer to define a query (e.g., dynamically or fixed in application code) and decouples the data access resolvers 124 from the API definition of the data proxy 120. The data proxy 120 may use a query language that is hierarchical, tailored to assist with providing front end views for a user interface, and provides strong typing with syntax and validity checking. The data proxy's type system may also be queryable by the query language itself.

A data proxy's 120 (e.g., server's) capabilities are referred to as the data proxy's schema. As discussed previously, a schema is defined in terms of the types and directives supported. The fundamental unit of a schema may be the type. For example, a query language used by the data proxy 120 may use types such as: scalar, object, enum, interface, union, list, non-null, and input object types. An example schema may represent a blog, which has a collection of blog posts. More specifically, the schema may look like the example schema presented below for a blog, where ! represents a required field and [ ] represents a collection.

type Blog {
      id: ID!
      title: String!
      posts: [Post]
    }
    type Post {
      id: ID!
      title: String
      body: String
      blogID: ID!
    }

A query language used by the data proxy 120 may have operations of at least three types. The first operation may be a query that is a read only fetch of data. The second operation may be a mutation that is a write operation followed by a fetch of the data mutated. The third operation may be a subscription that is a persistent request that publishes data in response to data store changes or data source changes made with mutations. More specifically, the subscription may be triggered in response to mutations that complete.

In order to query blog posts in this system, the query type may contains the following operations:
```
type Query {
    getPost(id: ID!): Post
    allPosts: [Post]
}
```
In order to add/update/remove blogs posts, the mutation type may contain the following operations:
```
type Mutation {
    addPost(id: ID!, title: String):Post
    updatePost(id: ID!, title: String, body: String):Post
    deletePost(id: ID!)
}
```
The mutation operation may contain a set of fields for data that may be mutated. The response to a mutation from a data store may be called a selection set or the results of the mutation. A field may be conceptually considered a function and can be associated with arguments, which alter the field's behavior. These arguments may be considered filter parameters or query parameters for a specific field. Each field in a type can resolve to a data store 112, data source, or data service 122 using the data access resolvers 124.

In one aspect, a field may include a field name. The field name may be used to invoke or call a service. For example, the field name may be resolved to invoke an API call. The API call may call a service such as a code function service or another service in a service provider environment.

The query language may provide directives to describe alternate runtime execution and type validation behavior. Directives may also be used to indicate the data source used to resolve a type or field.

The data proxy 120 may also define global types that applications may incorporate in order to use service capabilities like conflict detection for a conflict created with a mutation and complex objects (e.g. videos and photos). Hence, the data server may provide the following example types in a schema:
```
type ComplexObject {
    id: ID!
}
type VersionedObject implements ComplexObject {
    version: Int!
}
type ComplexFile {
    id: ID!
    path: String!
}
```
Applications may inherit from the ComplexObject. Applications that intend to use conflict detection through the data proxy 120 may inherit from the VersionedObject type. Applications that intend to use the data proxy 120 to store complex objects like videos and photos might either use ComplexFile directly or define types that extend ComplexFile.

Control Plane

FIG. 1 further illustrates that a control plane 128 may be used to manage the data proxy 120 (e.g., an endpoint to which clients connect) and the associated configuration of the data proxy 120. The control plane may be available in a geographic region of the service provider environment and accessible via a RESTful API that uses JSON (JavaScript Object Notation) in network messages. In addition, the control plan 128 may be accessible as graphical console through a browser.

The data proxy service 140 may be accessible through an API gateway and the control plane 128 may be accessible through code functions executing in a code function service. The code functions may be called directly by the application 152 on the clients 150 or the code functions may be called via the control plane 128 using a console interface. Metadata for the schema may be stored in key-value data store or another type of data store. The metadata may be loaded when the data proxy 120 is launched.

An administrator who uses the control plane 128 may authenticate and be authorized to make changes in the data proxy service 140 via a security management service to invoke the control plane operations. The data proxy 120 (or endpoint) with the query and mutation module 122 and the subscription module 126 may be accessible through a content delivery network, and the content delivery network may be used to provide DDoS (distributed denial of service) protection and response caching.

The control plane 128 may support various operations related to the data proxy 120 such as creating, deleting, getting, and listing the data proxies 120. The operations of creation, deletion, getting, updating, and listing can also apply to schema types such as objects, types, data sources, schemas, and modifying the scope of authorization for users to use the resources of the data proxy 120. Modifying the scope of authorization may also be described as modifying the user pool authorizations.

Figure 2:
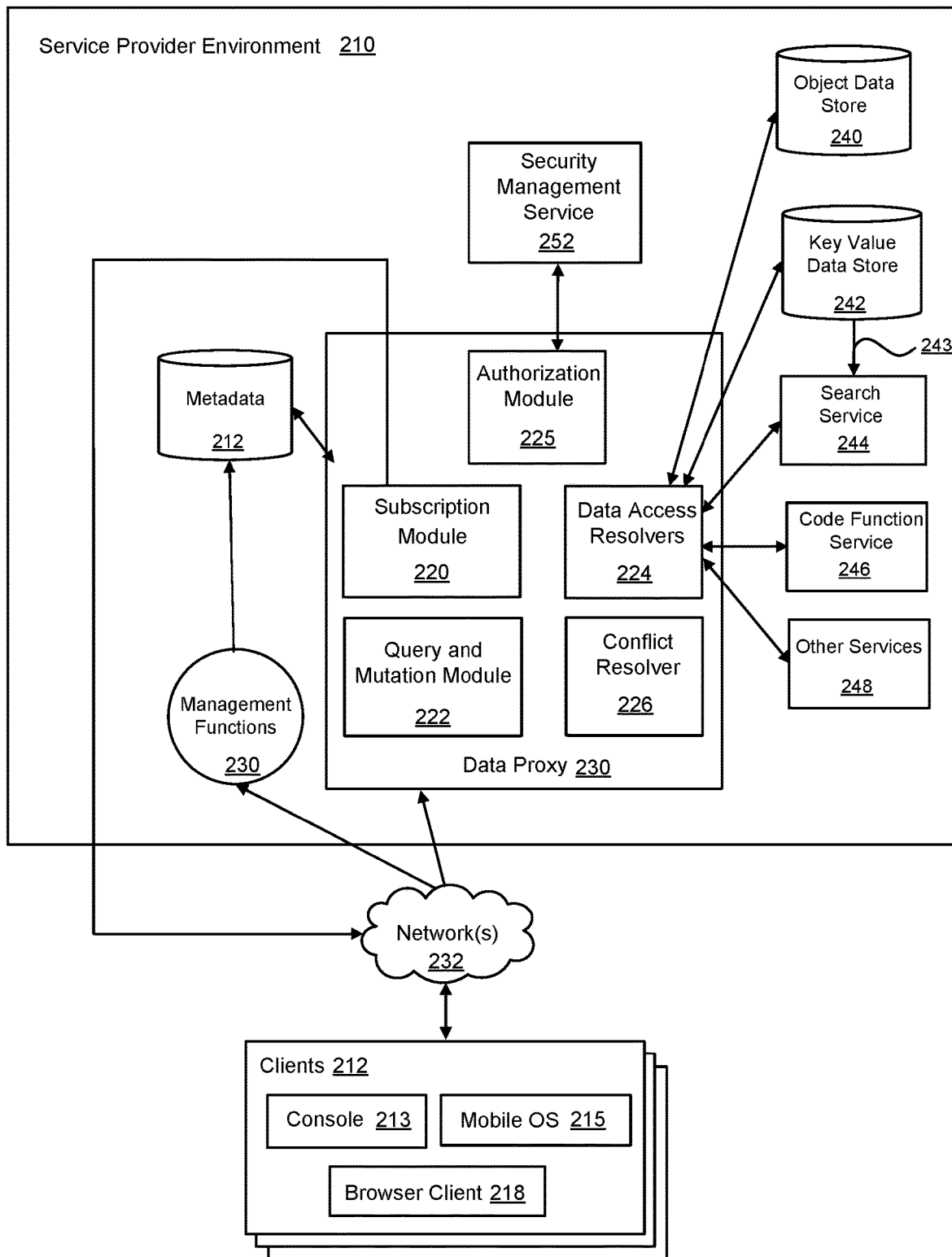
FIGS. 2 and 3A are block diagrams illustrating examples of a data proxy in a service provider environment according to examples of the present technology.

FIG. 2 illustrates the query and mutation module 222 that may be considered part of the data plane of this technology. When a data request is received, the data proxy 230 may build an abstract syntax tree (AST) from the request and execute the data access resolvers 224 for each type or field in the data request. Many categories of data sources may be accessed using the data access resolvers. For example, the data source may be a data store, a data service, or a code function. The data sources may be linked to a customer's account for the service provider environment 210 and may be authenticated using the client 212. This use of a customer's credentials for authentication means that the credentials may be passed along to the data sources with a query or mutation request made via the data access resolvers 224. The customer's credentials for accessing the data stores, data sources or other services may be used to access an object data store 240, a native key-value store 242, a search service 244 hosted within the service provider environment 210, a code function service 246 or other services 248 accessible via API calls in the service provider environment 210. Examples of other services 248 that may supply or store data may be block data storage services, data queueing services (e.g., a FIFO queue), data generation services or other services that may read and write data. Additional services 248 may perform transformative functions on data such as performing mathematical functions on the data, performing mapping functions, encryption, key generation, salting or other types of functions.

For example, the code function service 246 may include a code function that is capable of executing on a computing instance in the service provider environment 210. The code function is a segment of program code that may be like a function, and the code function may receive parameters, perform processing and provide return values. The code function may also be called a "program code", "compute service code", or "compute service program code." In one aspect, the code function may execute on a managed compute service code platform for back-end web services that runs a defined code function on the computing instance. That is, the code function may execute in a compute service that runs code in response to requests to execute the code function, and automatically manages the compute resources used by that code function. Once a code function has been executed and the appropriate results have been returned, the code function and results may be flushed from memory of the computing instance or container in which the code function was executing. The code function provides for building smaller, on-demand applications that may be responsive to requests, events and new information. For example, the code function may be used to automatically provision back-end services triggered by custom code function requests. In one aspect, the code function may be triggered in response to a request or an event, may execute or perform a function in response to the request or event, and may return a response or value.

An application that may use a search service 244 or data store operations not supported by the data proxy 230 may use the code function service 246 to execute a code function to implement such extended logic or extended service calls. In this case, the code function may act as a wrapper for accessing third party data sources or data services. The data sources (e.g. data stores, data services, other services, or code functions) may reside in the customer's account and the customer may have full access to the capabilities of the data sources accessible through the service provider environment 210. If a third party data source is accessed (e.g., using a code function), then the third party credentials may need to be provided to access that data source.

When a data query includes multiple fields, each of these fields may be resolved to separate or different data stores or data sources. In the example of a blog item that is being queried, the fields in the data structure representing the blog type may be resolved from multiple data sources. More specifically, a blog item may be stored in a key-value data store 242, the blog title may be returned from a code function executed in the code function service 246, and the posts may be queried from the search service. A data source and the identifiers used to access the data source in the service provider environment 210 may be defined in the data proxy 230 for access by the data access resolvers 224. A mapping may also be created between a field in a type of the data schema and the data source previously discussed.

For example, the data source with the appropriate field in the type may be set up:

$ create-resolver --project-resourcenum <project>

--type-name Query

--field-name getBlog

--data-source-name Key-ValueDataStore

--operation GetItem $ create-resolver --project-resourcenum <project>

--type-name Blog

--field-name title

--data-source-name CodeFunction

--operation GetTitle

These linking operations may modify the schema to the following:

type Query {
  getBlog(id: ID!): Blog
    @ resolver(name: Key-ValueDataStore, operation: GetItem)
}
type Blog {
  id: ID!
  title: String!
    @resolver(name: CodeFunction, operation: GetTitle)
  posts: [Post]
    @resolver(name: SearchService, operation: search)
}

When the blog type is retrieved thru the data proxy 230, a number of operations may occur. For the blog item and the id field, the data access resolver 224 may assume a security role provided by the security management service 252 and may query the key-value data store using the getitem operation. For the title field, the data access resolver 224 (e.g., a code function service resolver) may assume a security role to invoke the code function through the code function service 246. The data access resolver 224 submits the operation name ("get_title") and identity context to the code function, and the result is returned. For the posts field, the search service resolver portion of the data access resolver 224 may assume a security role as delegated from the security management service 252 and may invoke search service 244 operations.

Since each field in the selection set of the query (e.g., a domain specific language query) may resolve to a different data source, the service may also include query field timeouts to prevent unbounded queries, by using a bounded retry timeout for each field. The data proxy 230 may retry up to three times with exponential back-off and/or jitter.

The data proxy 230 may permit queries to run in parallel. In one example with three data fields, assuming each data access resolver takes 10 seconds and allowing for significant overhead, the total expected time for the query request is 10 seconds. However, a time limit for the query may be set at 20-30 seconds to ensure that the queries are completed.

Each operation in a mutation may be defined as executing serially. Assuming each resolver takes 10 seconds, the total time may be 10 seconds×N, where N is the number of mutation fields to be resolved in the request. The data proxy 230 may limit a mutation request that uses a data access resolver to run for at most 40-60 seconds. Multiple mutation operations in a single request may be expected to run to completion but completion of the mutation operations is not guaranteed. This is because each mutation may be run as a separate operation across potentially disparate data sources. However, there may be no theoretical limit on the number of operations in a mutation.

The clients 212 may communicate with the data proxy 230 using a console 213, a mobile operating system (OS) 215, a browser client 218 or another type of client platform. The console 213 may be downloaded to a client 212 and operate through the browser client 218. More specifically, clients 212 may execute queries and mutations by sending requests to the data proxy 230. The data proxy service may include multiple data proxies 230 (e.g., servers or computing instances) that have a load distributed across the data proxies 230 by an application load balancer, and the data proxies 230 may be accessible through a content delivery network. For example, each data proxy may be accessed using a unique DNS (domain name system) record through a content delivery network. The data proxy 230 may support unauthenticated requests identified by an API key, authenticated access through a security management service 252 in the service provider environment 210, or authentication that can be bootstrapped through a third party authentication service. In one configuration, the data proxy 230 and the related functions may be hosted in a virtual private cloud (VPC) or another virtualized network in a service provider environment 210.

The data proxy 230 may include an authorization module 225 that has all the features and capabilities of the authorization module 125 of FIG. 1. The authorization module 225 may be in communication with the security management service 252 to manage security, authorizations, and permissions for queries and mutations.

Conflict Resolution

Customers can enable object level conflict detection and resolution for data stores or data source resolvers. The conflict resolution may be performed by the conflict resolver 226. The conflict resolution may be set to have three modes. The first mode is no conflict detection. In this case, the data store overwrites the data in the data store and optionally updates a search service. In one configuration, this mode may be triggered when the mutation from a customer, client or application does not contain a version.

In the second mode when a conflict is detected, the conflict is rejected and the client may be notified. In this case, the mutation is rejected and is not applied to the data store or data source. In one configuration, conflict rejection may be used when a version field is provided and the version doesn't match the server. The type for an object can inherit VersionedObject to perform versioning.

The third mode may perform conflict detection with custom handling logic. In this case, a code function in a code function service in the customer's account may be triggered with the server state, incoming state, and context. A client may be presented with an option to choose which data may be written or not written. Alternatively, the code function may have custom logic that makes a decision on which data to keep and which data to reject. The output from the code function may be written to the data store table. In one configuration this mode may be triggered when a version field is provided and the version does not match the server. The type can inherit from the VersionedObject type to inherit versioning.

Customers may use conflict resolution code blocks in a code function to handle common conflict scenarios. This code function may be described as a pre-defined function used to handle the conflict resolution. Examples of such scenarios may include the ability to merge conflicting data in arrays, to determine JSON equivalence, etc.

An example for resolving conflicts for mutations at a data proxy 230 will now be described. Initially, a mutation may be received at a data proxy from an application executing at a client. The mutation may be a change to data stored in a data store 240 or data service accessible via a data access resolver 224. The data store 240 may reside in the service provider environment or the data store may be a third party data store located in a separate computing network.

The mutation may be sent to a data access resolver 224 to enable the mutation to be processed by a data store. A conflict message maybe received at the data proxy from the data access resolver for a mutation that was attempted to be applied at the data store. For instance, the conflict message may be a notification from the data store 240 that the mutation creates a conflict with data that is already stored at the data store or that the data already exists in the data store. As discussed, the conflict may be resolved at the data proxy using a conflict resolution function defined in the data proxy, and the data proxy controls the resolution of the conflict.

The conflict resolution function may be a pre-defined function that is a segment of program code executing on a code function service that presents values associated with the conflict message to the client and allows a selection of a value to write to the data store. In one aspect, the data proxy may simply resolve the conflict by rejecting the data mutation. The client may or may not be notified of the mutation being rejected at the data proxy.

Applications can also store complex types (photos, videos, etc.) using the data proxy 230. The client library may co-ordinate the creation of a pointer into the key-value data store 242 and then the blob may be uploaded to a customer-owned data object 240.

While an application may use the key-value data store and the search service independently, a common pattern is to replicate 243 key-value data store data (e.g., blog entries) into the search service for rich query support. A replication stream may be setup between a key-value data store and search service with a code function.

Subscriptions

Figure 3A:
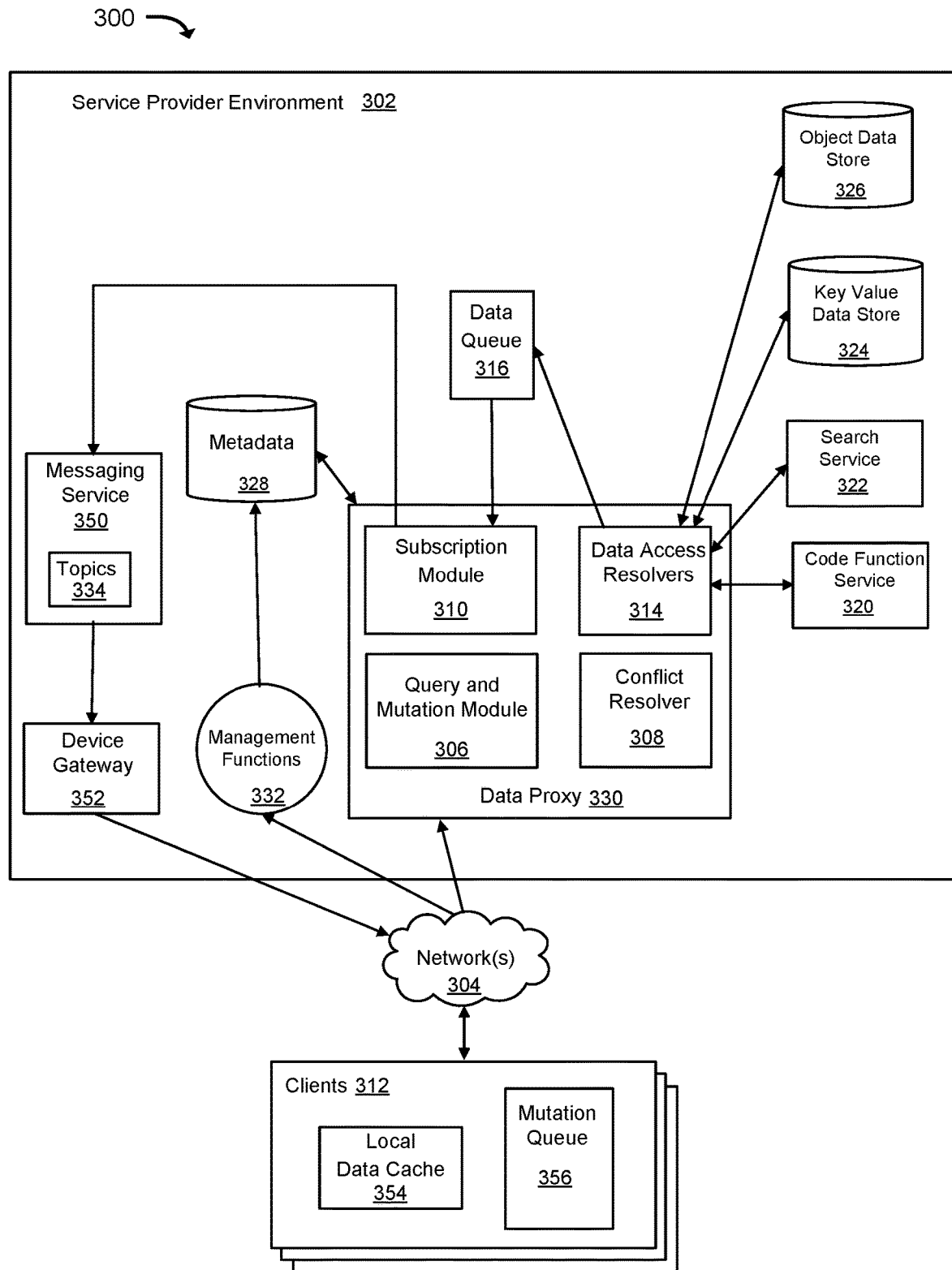

FIG. 3A illustrates an environment 300 of a data proxy 330 in a service provider environment 302. The environment 300 depicts the service provider environment 302, the data proxy 330, metadata 328, management functions 332, subscription module 310, query and mutation module 306, data access resolvers 314, a conflict resolver 308, an object data store 326, a key value data store 324, a search service 322, a code function service 320, networks 304, and clients 312 which have all of the same features and capabilities of similarly named illustrated elements in FIG. 2. Environment 300 depicts a data queue 316 that may receive data from the data access resolvers regarding mutations that have been applied to data stores. The data queue 316 may then send the data to the subscription module 310. The data queue 316 may be hosted in the service provider environment 302 outside of the data proxy 330.

The environment 300 depicts a technology configuration where clients 312 may receive state that changed on the data proxy 330 without polling. The data proxy 330 may use subscriptions that are represented in the query language to deliver subscription capability. Each client may subscribe with at least one configurable query and the query may be executed on the data proxy 330 (e.g., on the server) when an event occurs. In a worst case scenario, N clients×N queries=$O(N^2)$ requests against the underlying data source per event might results in overloading the system. In order to avoid this scenario, subscriptions may have the following functionality: 1) Subscriptions are triggered upon completion of a successful mutation; 2) A client or application may subscribe to the result of a mutation.

A client or application may request to be notified when a blog post is added or updated. For example, the mutation defined in the schema may be defined as:

type Mutation {
      addPost(id: ID!, title: String): Post
      updatePost(id: ID!, title: String, body: String): Post
   }

The data proxy may allow the client to subscribe to the mutation results event generated when either addPost( ) or updatePost( ) completes. In one example of the data proxy, subscriptions to non-mutation events are not permitted. When a subscription is created, the schema may contain a subscription type with operations mapped to the corresponding mutation operations. Mutation field names may be unique in the schema and may be referenced in the @subscribeTo directive, as an example.

type Subscription {
      addPost: Post
      @subscribeTo(mutation: addPost)
      updatePost: Post
      @subscribeTo(mutation: updatePost)
    }

The client 312 may send a subscription request to the data proxy 330 to register for addPost( ) and updatePost( ) events. When either operation completes, the Post object may be delivered to subscribed eligible clients.

Publications

Referring further to FIG. 3A, the data proxy 330 may also configured to send messages to a messaging service 350 with publish subscribe capabilities. A gateway device 352 may also be available for clients to connect through and receive messages on topics 334, which may be pre-defined topics, via the messaging service 350. The connections between the clients 312 and the device gateway 352 may use the MQTT (Message Queuing Telemetry Transport) protocol, Web Socket protocol, or long polling queue model to implement the transport for the subscriptions. Alternative types of connection protocols may also be used, such as MQTT-S over TCP/IP (Transmission Control Protocol/Internet Protocol), UDP (user datagram protocol) or other messaging protocols.

Messages for the plurality of subscriptions may be sent to a messaging service 350 to enable the messaging service 350 to publish the message to clients 312 subscribed to topics for the plurality of subscriptions. The messaging service may be based on a publish-subscribe model where devices subscribe to a topic and the messaging service may push the messages to the subscribed devices using a connection with a client device. Other type of messaging services may be employed such as messaging service that uses a a data queue and a long polling protocol that pushes out messages to clients. For a message system using long polling, the client may initiate a connection for a message and wait until a queue messaging system push the message to the client. The topic may have been previously created using at least one subscription field name and subscription arguments. Each client 312 may connect to a topic 334 with a topic name that is generated based on subscription's field name and at least one argument. The topics can be provided to the clients to enable the clients or devices to receive changes to the fields associated with a subscription. Thus, when changes occur to data objects in the schema, the subscribed devices receive notification with the generated topic.

Figure 3B:
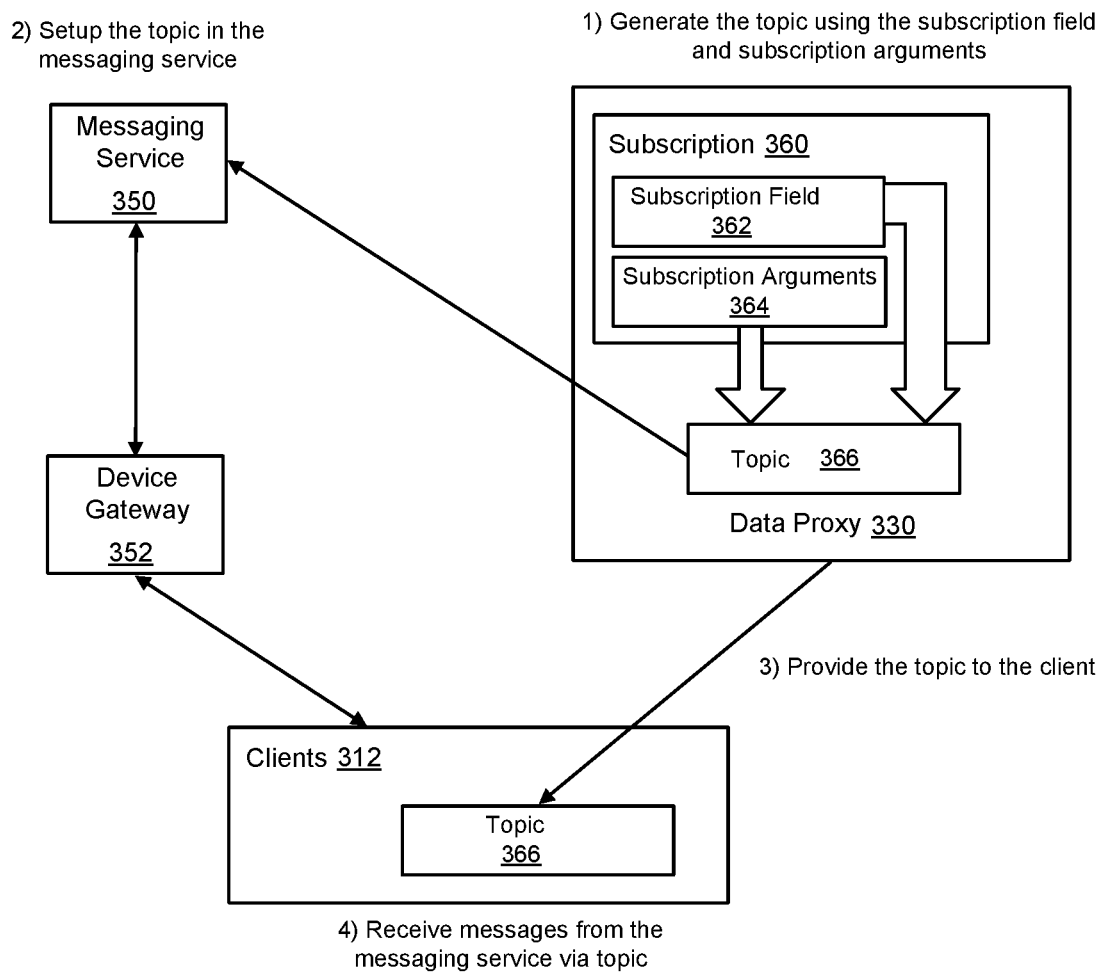
FIG. 3B is a block diagram that illustrates topic creation using a subscription according to an example of the present technology.

FIG. 3B illustrates a block diagram for topic creation. A topic associated with a subscription 360 may be referred to as a topic 366 or a subscription topic and may be generated at the data proxy 330 using a subscription field 362 and subscription arguments 364 for a subscription. The topic 366 may be setup in the messaging service 350 by making a request to the messaging service 350 to setup the topic.

The topic 366 may be provided to the client 312 as illustrated. The client 312 may then subscribe to the topic 366 and receive messages from the messaging service 350 via the topic 366. Connection information may have been previously sent to the client 312 to enable the client 312 to connect to the device gateway 352 and receive messages via a topic and the messaging service 350. The connection information may include a topic identifier, a client identifier for connection to the service provider environment, and a pre-signed Uniform Resource Locator (URL) that is scoped to topics that are subscribed to (only one client can connect using the pre-signed URL). The pre-signed URL may be signed using public key cryptography and the data proxy 330 may maintain possession of the private key. The connection to the device gateway 352 is kept open by the device gateway 352 to enable data update to be sent over topics at any time.

All events from a subscription that are intended for one or more clients are published on the same named topic. Any client that wants to subscribe to the same subscription, where the subscription field and subscription arguments are the same, may be subscribed to the identical topic via the messaging service 350. The messaging service 350 may be used as a transport mechanism for the messages with a single topic per subscription (e.g., as defined by the subscription name and parameters) and the subscription module 220 may publish the message to each topic. If more than one client 312 subscribes to an identical topic name with identical parameters, then each client 312 will receive the same subscription topic and each topic can have many subscribers. This re-use of the same topic enables many clients 312 to receive the same topic updates over one topic. Once a notification is processed by the subscription module 220, the subscription module 220 may try up to three times to submit the message to the messaging service 350.

Clients may authenticate and connect to a device gateway 352 in communication with the messaging service 350, by using credentials from a security management service or a third party authentication service. A custom client library with custom authorization functions may be used to ensure that the connecting client 312 has registered for subscriptions and is connecting to the correct named topic.

Subscription Fan-Out

To set up subscriptions in the system, a plurality of subscription requests for applications may be identified at a data proxy. A mutation may be received at the data proxy from an application executing at a client. The mutation may be sent to a data store via a data access resolver associated with the data proxy. After a mutation is committed to a data store, the mutation name and result set is sent via the data proxy 330 to the subscription module 310 or sub-system. The subscription module 310 may look up subscription queries along with candidate clients, identity tokens, and authorization scope related to the mutation event.

Figure 3C:
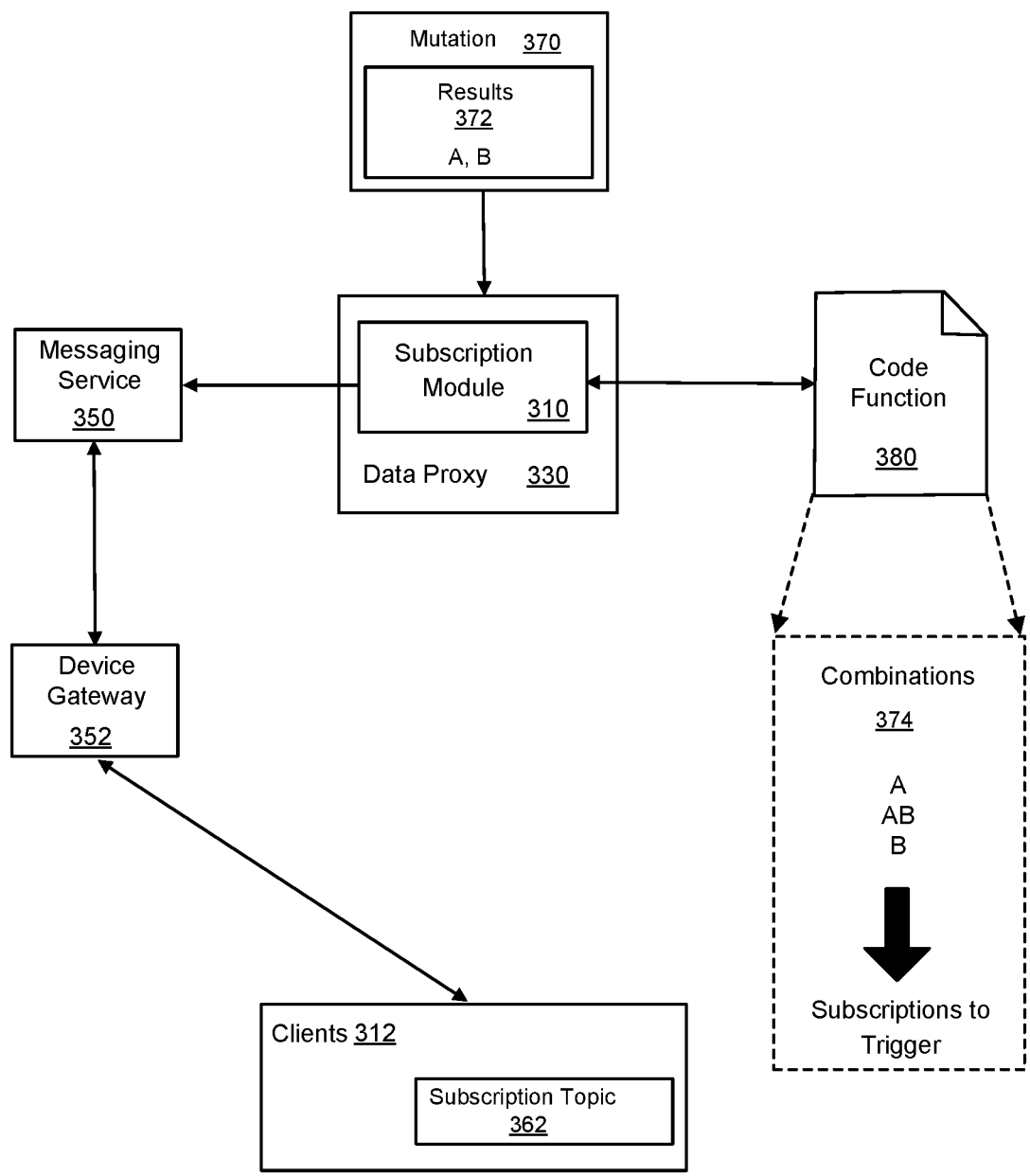
FIG. 3C is a block diagram that illustrates subscription fan out according to an example of the present technology.

FIG. 3C illustrates a block diagram depicting a subscription fan out. A mutation 370 may have a set of results 372, the results 372 may include A and B fields. The way in which the subscriptions are selected in response to the results 372 received may enable fan out and scalability for the subscriptions. A plurality of subscriptions may be identified which match combinations of fields in the results for the mutation. A code function 380, that is a segment of program code executing on a code function service, may be used to identify a plurality of subscriptions which match combinations 374 of the fields in the results for the mutation 370. The code function 380 may be a code function such as a code function that executes on a code function service, as described earlier. For example, if the results 372 include A, B, then the combinations 374 include A, AB, and B as depicted. Accordingly, these three subscriptions may be looked up to see if they exist, and if these three subscriptions exist, the subscriptions may be sent to the data proxy 330 and executed by the data proxy 330 (or alternatively executed by the code function 380). The data proxy 330 may have the subscriptions from a schema that was pulled from metadata when the data proxy 330 was initialized. The data proxy 330 may send the subscriptions to the code function 380 along with the results of the mutation so the fan out operation or identification of the subscriptions matching the combinations of results of the mutation may be performed.

In an alternative configuration, the code function or another function for generating the combinations and finding the corresponding subscriptions may be executing on the data proxy 330. This may depend on the overall workload allocated to the data proxy 330 and the number of mutations being received.

In one aspect, the number of combinations of fields in the results for the mutation is $2^N$ where N is the number of inputs representing fields from the results of the mutation. For example, if there are 3 fields in the results of the mutation, then there may $2^3$ or 8 combinations of the 3 mutation fields. Thus, up to 8 subscriptions may be triggered, if such subscriptions exists. Triggering this limited number of subscription provides a much lower update rate than executing every subscription for every client to update application data which might result in an O ($N^2$) operation as compared to a $2^N$ operation. The number of inputs N may be limited to a predetermined number. For example, the number of inputs N may be limited to 3, 5, 25, or any other number.

Then the subscription module 310 may filter out clients 312 that are not connected to the device gateway 352 to generate a list of eligible clients. For each client, the fields in the event that are not in the authorization scope may be set to null (e.g., values may be removed or blocked). Alternatively, the fields may be removed from the message if the fields are not authorized. Another operation is that fields may be removed from the payload that are not in the subscription query. The remaining fields may then be published using a message to a topic that has been created in the message service 350 to enable receipt of the message by the client.

The clients 312 may include libraries that transparently synchronize read and write operations with the cloud through an optimistic write-through cache. One example of an existing client side framework that may be used may be the Apollo client for Android, iOS, and Javascript. Other client side frameworks may also be used. The clients 212 may provide write-through caching, sub-query support, basic offline capabilities, and persistence to local storage.

Referring again to FIG. 3A, the client can cache queries and objects in a local data cache 354. In one example, the local data cache 354 may be a local key value store, a local relational database, a local flat file or another type of local cache. This caching may help provide a persistence layer that allows the application to be used even when network connectivity is not available.

The application may run queries with one of the following strategies at the client. In the first strategy, the queries may return cached data or else a fetch to the data stores and data sources is performed. In the second strategy, the queries may be set to fetch remote data only. In another strategy, the queries may return cached data then fetch a potential update to the data via the data proxy 330.

When a message is received by a client 312 over a subscription topic 334 or channel, the client library may locate the object in the local data cache 354 (or client cache) and update the object in the local data cache 354 if the version of the data retrieved is later than what is stored. Otherwise, the object in the message will be discarded.

Synchronization

Referring again to FIG. 3A, when a client has been offline (e.g., not connected to a network or the internet) for a period of time then a process for synchronizing data with a delayed subscription delivery may be performed. Prior to any re-synchronization, mutations that are created when a device is offline may be stored in a mutation queue 356. The mutation queue 356 may be associated with the client 312 and provide the offline queueing functions. Mutations may be executed synchronously when online and may be stored in a mutation queue 356 (e.g., a FIFO (first in first out) queue) when offline.

When an offline client comes back online, a network connection may be accepted from a client at a data proxy. In addition, the client may have been previously connected to the data proxy. For example, the client may be online network state or connected to the data proxy and then the client may end up in an offline network state (e.g., disconnected from the internet). In a more specific example, the client may be a mobile device that moves into an area where the client is not able to receive reception for a wireless data connection. The client may then come back online and establish the network connection (e.g., using a Web Socket).

A request may be received at a data proxy from an application at the client for a data snapshot, and the data snapshot includes data generated by other applications or clients while the client 312 was offline. The data snapshot may include data that would have been sent to the client 312 via a subscription if the client 312 or device was online during the time period the data was updated. The data snapshot may be sent to the client 312 in response to the request.

A subscription may be held for a pre-determined amount of time after the request for the snapshot. The data for the subscription being held is generated after the network connection has been made. The subscription data may be held to allow the client time to receive the data snapshot and process the data snapshot, so that the subscription data may be applied to the client after the snapshot data has been applied. Data for the subscription may be sent after the pre-determined amount of time. The pre-determined amount of time may be any amount of time. For example, the pre-determined amount of time may be 10 seconds or 30 seconds.

In one aspect, the data proxy tracks the time difference between the network connection and the request for the data snapshot and then bases the pre-determined amount of time on this time difference. For example, the pre-determined amount of time may be the time difference or may be the time difference plus an additional amount of time such as 5 or 10 seconds. Alternatively, a fixed amount of time may be used for the pre-determined amount of time before the subscriptions are sent.

In one aspect, after the network connection is accepted by the data proxy, the client may send the mutations in the queue to the data proxy. The mutations may have been optimistically cached and serially ordered at the client, while the client was offline. These mutations may be serially applied to the data sources (e.g. data stores, data services, other services, and/or code functions).

In one aspect, after the pre-determined period of time has expired, the messaging system may resume sending messages to the client without delaying or holding the messages. The mutations in the mutation queue may be drained one at a time when connectivity is restored and the resulting changes, if any, are applied on the data proxy 330 side.

If the client is not authorized to perform updates after connectivity is restored, a failure callback may be returned from the data proxy 330 with an authorization error. The client may provide a re-authentication callback function that an application may use to acquire a new authorization token before draining the mutation queue. When an offline state occurs for the client, mutations may be optimistically applied to the local data cache 354 (e.g., this stores the local state) and then executed against the server later, as described above. If a mutation or change is rejected because of a conflict, then the local state may be overwritten with the server state (i.e., the server wins). Subsequent mutations may follow this process attempting to optimistically apply changes to the local state and then the server, but the client may replace the local state with the server state in case of conflict scenarios.

The clients 150 of FIG. 1, the clients 212 of FIG. 2, and the clients 312 of FIGS. 3A-C may be a device such as, but not limited to, a mobile device, a tablet, a laptop, a desktop computer, a television, a mobile phone, a smart phone, a hand held messaging device, a set-top box, a gaming console, a personal data assistant, an electronic book reader, heads up display (HUD) glasses, a car navigation system, or any device with a display that may receive and present the media content.

The applications described in this disclosure may be used in computing areas such as point-of-sale system in pop-up stores which have poor or no internet connections. Another application may be a chat program that is used with multiple clients. Mobile applications may also be created with the described technologies for: direct sales in combination with tracked electronic marketing and email campaigns, airline bag tracking applications with notifications sent to mobile devices, or restaurant table reservation applications, etc.

Versioning

Schemas used with the data proxy 330 are immutable and versioned. Each revision to a schema may be stored in a metadata store 330 in a key-value data store decomposed into individual types, resolvers, and data sources. Any mutating of a type, a data source, or schema operations may be configured to generate a new version of the schema document. The customer can specify which version is the default for the data proxy 330. The data proxy may stores all schema versions and the application, or client can use any of those versions. The schema versions may be stored in the metadata store 330 and may then be loaded when the data proxy is launched. Alternatively, the metadata for the schema maybe stored in an image of the data proxy and may be loaded when the data proxy 330 is launched without access to an external data store.

Since the data proxy 330 has access to all of the schema versions, a client can specify that a query language request be evaluated against a specific version of the schema instead of the latest version of the schema. This allows customers to roll out schema changes without waiting for clients to be updated. The schema version request may be embedded in a version header that is included in the data schema.

Certain processing modules may be discussed in connection with this technology. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 4:
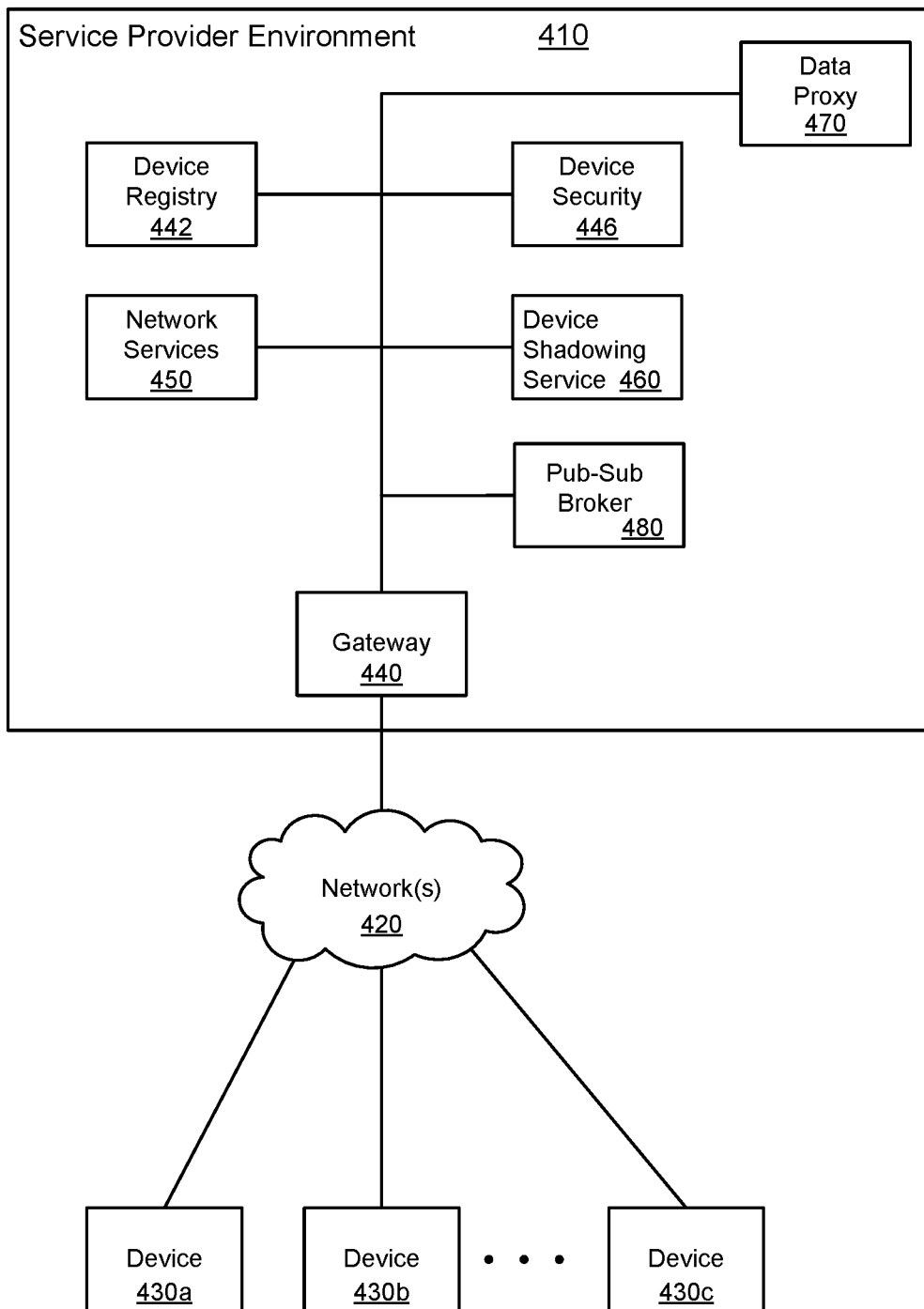
FIG. 4 is a block diagram of an example computer networking architecture for providing devices access to network services in a service provider environment according to an example of the present technology.

FIG. 4 is a block diagram illustrating an example service provider environment 410 with which the clients that may be devices 430a-c may communicate. For example, a client or device may be a mobile device, a tablet, a laptop, or another hardware device with an application on the device. Particularly, the environment of FIG. 4 may be useful for clients and devices, which were described earlier. The clients or devices may be able to use the services illustrated in FIG. 4 and once connected receive data update messages from the data proxy 470 of the technology described in FIGS. 1-3. The service provider environment 410 may include a device communication environment or device support system that comprises various resources made accessible to the devices 430a-c that access the gateway server 440 via a network 420. The devices 430a-c may communicate with the service provider environment 410 in order to access services such as a device shadowing service 460, data storage, and computing processing. Services operating in the service provider environment 410 may communicate data and messages to the devices 430a-c in response to requests from the devices 430a-c and/or in response to computing operations within the services.

The service provider environment 410 may comprise communicatively coupled component systems 440, 442, 446, 450, 460 and 480 that operate to provide services to the devices 430a-c. The gateway server 440 may be configured to provide an interface between the devices 430a-c and the service provider environment 410. The gateway server 440 may receive requests from the devices 430a-c and may forward corresponding data and messages to the appropriate systems within the service provider environment 410. Likewise, when systems within the service provider environment 410 may attempt to communicate data instructions to the devices 430a-c, the gateway server 440 routes those requests to the correct device 430a.

The gateway server 440 may be adapted to communicate with varied devices 430a-c using various different computing and communication capabilities. For example, the gateway server 440 may be adapted to communicate using either TCP (Transmission Control Protocol) or UDP (User Datagram Protocol) protocols. Likewise, the gateway server 440 may be programmed to receive and communicate with the devices 430a-c using any suitable protocol including, for example, MQTT, CoAP, HTTP, and HTTPS. The gateway server 440 may be programmed to convert the data and instructions or messages received from the devices 430a-c into a format that may be used by other server systems in the service provider environment 410. In one example, the gateway server 440 may be adapted to convert a message received using the HTTPS protocol into a JSON formatted message that is suitable for communication to other servers within the service provider environment 410.

The gateway server 440 may store, or may control the storing, of information regarding the devices 430a-c that have formed a connection to the particular gateway server 440 and for which the particular gateway server 440 may be generally relied upon for communications with the device 430a. In one example, the gateway server 440 may have stored thereon information specifying the particular device 430a such as a device identifier. For each connection established from the particular device 430a, the gateway server 440 may also maintain information identifying the connection. For example, a connection identifier may be generated and stored for each connection established with a particular device 430a. Information relating to the particular connection may also be stored. For example, information identifying the particular socket of the gateway server 440 on which the connection was established, as well as information identifying the particular protocol used by the device 430a on the connection may be stored by the gateway server 440. Information such as the socket and protocol may be used in order to facilitate further communications via the particular connection.

In one example, the gateway server 440 may communicate via any suitable networking technology with a device registry server 442. The device registry server 442 may be adapted to track the attributes and capabilities of each device 430a. In an example, the device registry server 442 may be provisioned with information specifying the attributes of the devices 430a-c. The device registry server 442 may comprise data specifying rules or logic (e.g., automation rules) for handling various requests that may be received from the devices 430a-c. The device registry server 442 may be programmed to convert specialized device functions or commands received in particular communication protocols such as, for example HTTPS, MQTT, CoAP, into functions or commands using particular protocols that are understood by other of the servers in the service provider environment 410. In one example, the device registry server 442 may be provisioned with information specifying that upon receipt of a particular request from a particular device 430a, a request should be made to process and/or store the payload data of the request in a particular network service server 450. The device registry server 442 may be similarly programmed to receive requests from servers 442, 450 and convert those requests into commands and protocols understood by the devices 430a-c.

A customer may also be able to create a delivery group or group of devices in the device registry 442. These delivery groups may be retrieved by the delivery service from the device registry 442 as part of creating a deployment. In this case, a delivery group need not be defined with the data deployment but may be referred to using a delivery group defined in the device registry.

The device shadowing service server 460 may maintain state information for each connected device 430a. In an example embodiment, the device shadowing service server 460 maintains information specifying a plurality of states for each device 430a that has connected to the environment 410. In an example scenario, the device shadowing service server 460 may comprise a recorded state and a desired state. The recorded state represents the existing state of the particular devices 430a-c as presently known to the device shadowing service server 460. The device shadowing service server 460 may be configured to manage multi-step device state transitions. The device shadowing service server 460 communicates with the device gateway 440 in order to communicate requests to update a status to a particular device 430a. For example, the device shadowing server 460 may communicate a sequence of state transition commands to the device gateway 440 that update the status of a device 430a. The device gateway 440 may, in response, communicate the appropriate commands formatted for the particular device.

The device security server 446 maintains security-related information for the devices 430a-c that connect to the service provider environment 410. In one example, the device security server 446 may be programmed to process requests to register devices with the service provider environment 410. For example, entities such as device manufacturers, may forward requests to register devices 430a-c within the service provider environment 410. The device security server 446 receives registration requests and assigns unique device identifiers to devices 430a-c which use the device identifiers on subsequent requests to access the service provider environment 410. The device security server 446 stores, for each registered device, authentication information that may be provided during the device registration process. For example, a request to register a device 430a may comprise information identifying the device 430a such as a device serial number and information for use in authenticating the device 430a. In one example, the information may comprise a digital certificate and may comprise a public key of a public key-private key pair. The information may be stored in relation to the assigned device identifier for the particular device 430a. When the device 430a subsequently attempts to access the service provider environment 410, the request may be routed to the device security server 446 for evaluation. The device security server 446 determines whether authentication information provided in the request is consistent with the authentication information stored in relation to the device identifier and provided during the registration process.

The device security server 446 may be further programmed to process request to associate particular entities (individuals or organizations) with particular devices 430a-c. The device security server 446 may be adapted to receive requests to register entities, which may be, for example, individuals, users, accounts, and/or organizations, as authorized to control or communicate with a particular device 430a. In one example, a request may be received from an individual or organization that may have purchased a device 430a from a manufacturer. For example, the device may be a dishwasher, thermostat, or lighting assembly that an individual or organization purchased from the manufacturer. The individual or organization may initiate a request to register the device 430a with the individual or an organization with which the organization is associated. The request may be routed to a web services server which may be in service provider environment 410 or which communicates the request to the service provider environment 410. The request identifies the device 430a and the particular entity (individual or organization) that is requesting to be associated with the device 430a. In one example, the request may comprise a unique device identifier that was assigned when the device 430a was registered with the system. The request further may comprise information uniquely identifying the entity that is registering as having authority to communicate with and/or control the particular device 430a.

The device security server 446 stores the information identifying the particular entity in relation with the device identifier. When the particular entity subsequently attempts to control or communicate data to the particular device 430a, the device security server 446 may use the information to confirm that the particular entity is authorized to communicate with or control the particular device 430a. When an entity that has not been registered as being authorized to communicate with the device 430a attempts to communicate with or control the device 430a, the device security server 446 may use the information stored in the device security server 446 to deny the request.

A network services server 450 may be any resource or processing server that may be used by any of servers 440, 442, 446, 460 or 480 in processing requests from the devices 430a-c. In one example, network services server 450 may provide data storage and retrieval services and/or on-demand processing capacity. In an example scenario, the network services server 450 may be any of numerous network accessible services including, for example, web or cloud-based services. In one example, the network services server 450 may be programmed to provide particular processing for particular devices 430*a-c* and/or groups of devices 430*a-c*. For example, a network services server 450 may be provisioned with software that coordinates the operation of a particular set of devices 430*a-c* that control a particular manufacturing operation.

Servers 440, 442, 446, 450, 460 and 480 may be communicatively coupled via any suitable networking hardware and software. For example, the servers may communicate via a local area network or wide area network or a virtualized overlay network in the service provider environment 410.

The devices 430*a-c* may be any devices that may be communicatively coupled via a network 420 with the service provider environment 410. For example, the devices 430*a-c* may be computing devices such as smart phones and tablet computers, automobiles, appliances such as washers and driers, industrial sensors, switches, control systems, etc. In one example, each of devices 430*a-c* may communicate over the network 420 to store data reflecting the operations of the particular device 430*a* and/or to request processing provided by, for example, a network services server 450. While FIG. 4 depicts three devices 430*a-c*, it will be appreciated that any number of devices 430*a-c* may access the service provider environment 410 via the gateway server 440. Further it will be appreciated that the devices 430*a-c* may employ various different communication protocols. For example, some devices 430*a-c* may transport data using TCP, while others may communicate data using UDP. Some devices 430*a-c* may use MQTT, while others may use CoAP, and still others may use HTTPs. It will also be appreciated that each of the devices 430*a-c* may be programmed to send and receive particular functions or commands in requests that are not compatible with other devices or even the systems within service provider environment 410. The gateway server 440 may be programmed to receive and, if needed, attend to converting such requests for processing with the service provider environment 410.

The service provider environment 410 may be in communication with a data proxy 470 and a pub-sub broker 480. For example, the data proxy 470 may have similar capabilities and features of the data proxy 120 of FIG. 1 and may be employed to manage and deliver a data object to the device 430*a*. The pub-sub broker 480 may have similar capabilities and features to the messaging service 350 of FIG. 3A. The pub-sub broker may receive messages from the data proxy 470 and forward the messages to devices 430*a-c* subscribed to particular messaging topics.

Figure 5:
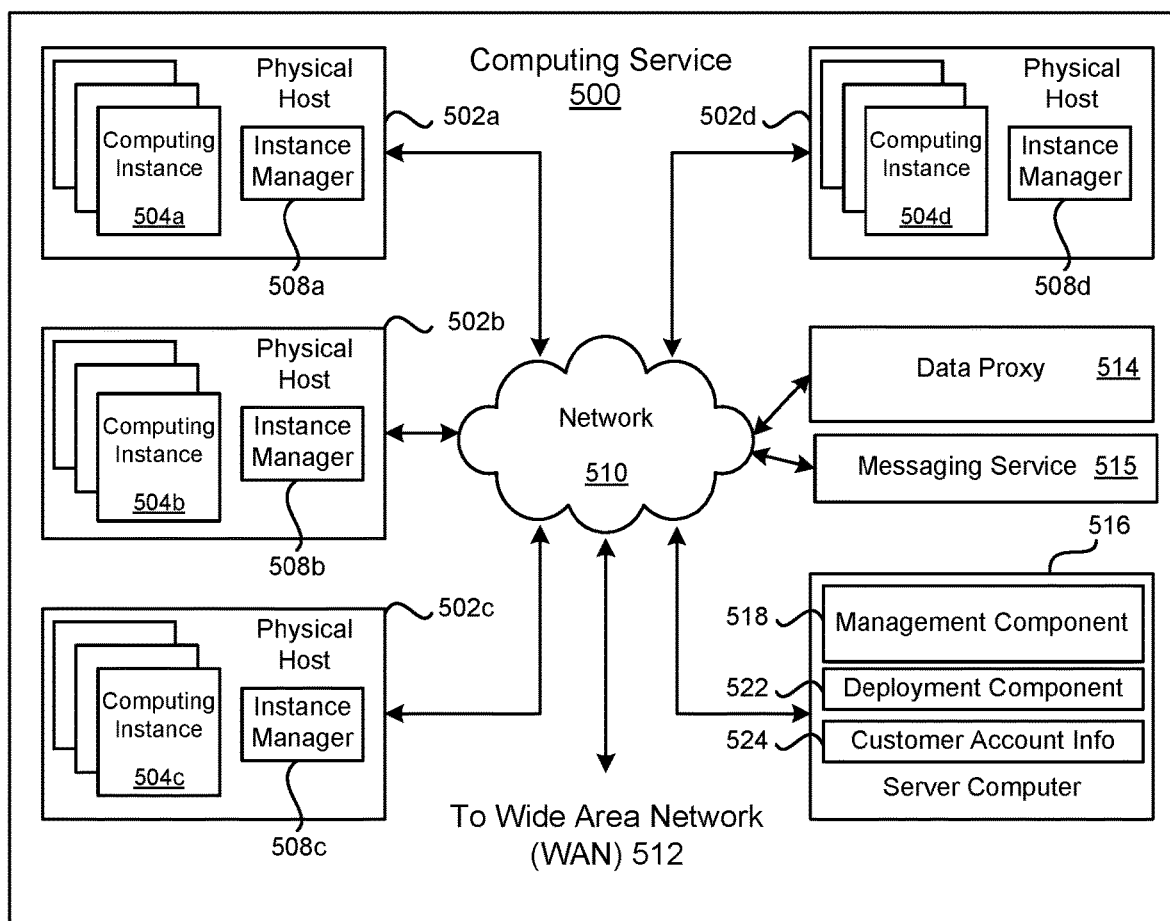
FIG. 5 is a block diagram that illustrates an example computing service environment according to an example of the present technology.

FIG. 5 is a block diagram illustrating an example computing service 500 or service provider environment that may be used to execute and manage a number of computing instances 504*a-d* upon which the present technology may execute. In particular, the computing service 500 depicted illustrates one environment in which the technology described herein may be used. The computing service 500 may be one type of environment that includes various virtualized service resources that may be used, for instance, to host computing instances 504*a-d*.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked clients, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502*a-d*. The server computers 502*a-d* may also be known as physical hosts. While four server computers are shown, any number may be used, and large data centers may include thousands of server computers. The computing service 500 may provide computing resources for executing computing instances 504*a-d*. Computing instances 504*a-d* may, for example, be virtual machines. A virtual machine may be an instance of a software implementation of a machine (i.e. a computer) that executes applications like a physical machine. In the example of a virtual machine, each of the server computers 502*a-d* may be configured to execute an instance manager 508*a-d* capable of executing the instances. The instance manager 508*a-d* may be a hypervisor, virtual machine manager (VMM), or another type of program configured to enable the execution of multiple computing instances 504*a-d* on a single server. Additionally, each of the computing instances 504*a-d* may be configured to execute one or more applications.

The data proxy 514 may be the same as the data proxy 120 of FIG. 1 and the data proxy 230 of FIG. 2 with the same features and capabilities. The messaging service 515 may be the same as the messaging service 350 of FIG. 3A with the same features and capabilities.

A server computer 516 may execute a management component 518. A customer may access the management component 518 to configure various aspects of the operation of the computing instances 504*a-d* purchased by a customer. For example, the customer may setup computing instances 504*a-d* and make changes to the configuration of the computing instances 504*a-d*.

A deployment component 522 may be used to assist customers in the deployment of computing instances 504*a-d*. The deployment component 522 may have access to account information associated with the computing instances 504*a-d*, such as the name of an owner of the account, credit card information, country of the owner, etc. The deployment component 522 may receive a configuration from a customer that includes data describing how computing instances 504*a-d* may be configured. For example, the configuration may include an operating system, provide one or more applications to be installed in computing instances 504*a-d*, provide scripts and/or other types of code to be executed for configuring computing instances 504a-d, provide cache logic specifying how an application cache is to be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. In addition, the network 510 may include a virtual network overlaid on the physical network to provide communications between the servers 502a-d. The network topology illustrated in FIG. 5 has been simplified, as many more networks and networking devices may be utilized to interconnect the various computing systems disclosed herein.

FIG. 6 is a flowchart of an example method 600 for resolving conflicts for mutations at a data proxy according to an example of the present technology. The functionality 600 may be implemented as a method and executed as instructions on a machine, where the instructions are included on at least one computer readable medium or one non-transitory machine-readable storage medium. For example, starting in block 610, a mutation may be received at a data proxy from an application executing at a client. The data proxy may be hosted by a service provider environment and the mutation may have been stored in a cache at the client and the mutation may have been sent after the client connected to the service provider environment. The mutation may be a change to data stored in the data store accessible via a data access resolver. The data store may reside in or out of the service provider environment. The data store may be an object data store, a key-value data store, an elastic store, a relational database such as an SQL database, a search service, a third-party data service, or third-party data source. In one aspect, a portion of the mutation may be sent to a code function service.

The mutation may be sent to a data access resolver to enable the mutation to be processed by a data store, as in block 620. A conflict message maybe received at the data proxy via the data access resolver for a mutation with a conflict at the data store, as in block 630. The conflict message may be a notification from the data store that the mutation creates a conflict with data that is already stored at the data store. The conflict may be resolved at the data proxy using a conflict resolution function initiated by the data proxy, as in block 640. In one aspect, the data proxy controls the resolution of the conflict.

The conflict resolution function may be a segment of code function executing on a code function service that presents values associated with the conflict message to the client and allows a selection of a value to write to the data store. In one aspect, the data proxy may resolve the conflict by rejecting the data mutation. The client may or may not be notified of the mutation being rejected at the data proxy.

Another operation may be determining whether to apply the mutation to the data store via a data access resolver associated with the data proxy after the conflict has been resolved, as in block 650. In one example configuration, the data proxy may send a message about the mutation to devices having a subscription associated with the mutation, after the mutation is written to the data store. The message may be sent using a messaging service and is sent to devices subscribed to a topic associated with the mutation. Therefore, the data proxy may be employed to update data stored a device in response to mutations applied to a data store.

Figure 7:
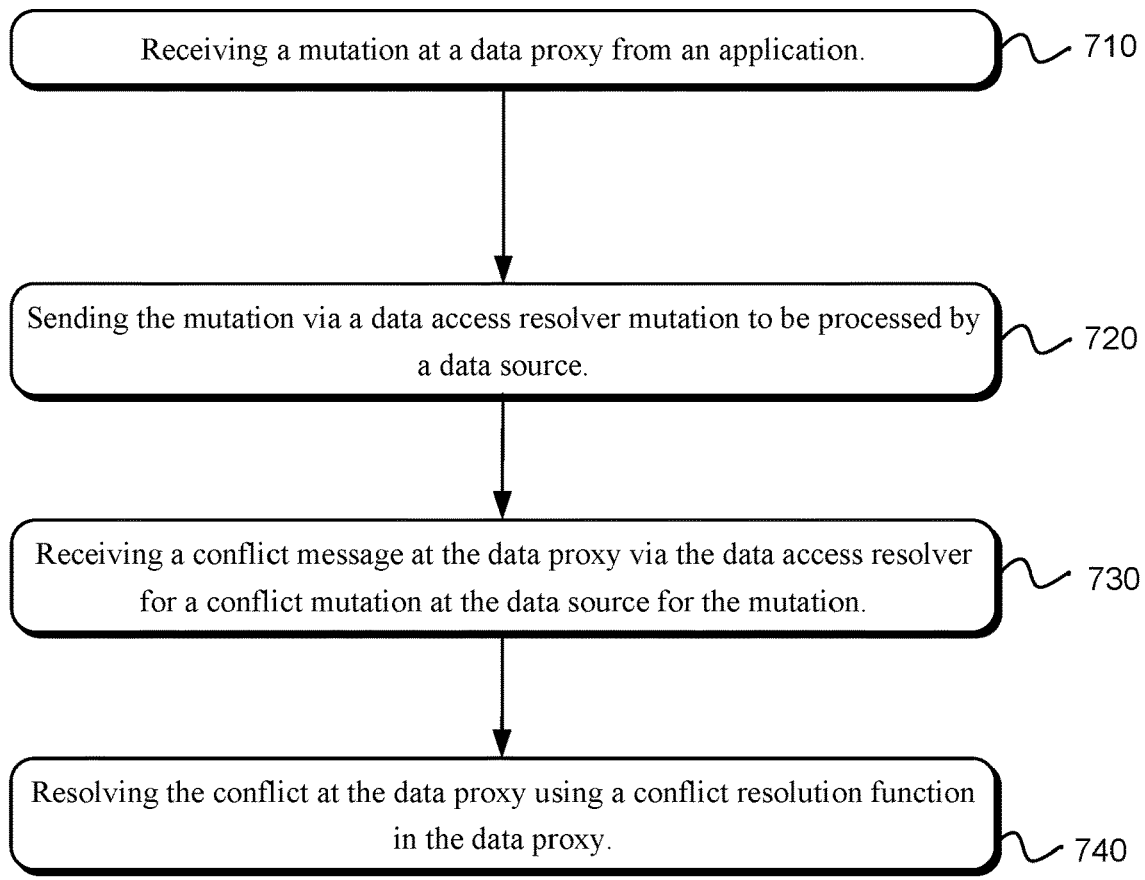

FIG. 7 is a flowchart of an example method 700 for resolving conflict for mutations at a data proxy according to an example of the present technology. The functionality 700 may be implemented as a method and executed as instructions on a machine, where the instructions are included on at least one computer readable medium or one non-transitory machine-readable storage medium. For example, starting in block 710, a mutation may be received at a data proxy from an application. The mutation may be sent via a data access resolver to be processed by a data source, as in block 720. A conflict message may be received at the data proxy via the data access resolver for a conflict mutation at the data source for the mutation, as in block 730. The conflict may be resolved at the data proxy using a conflict resolution function in the data proxy, as in block 740. The conflict resolution function may be a function that launches in a container on a computing instance in a service provider environment and is a segment of code function that is capable of receiving parameters, performing processing, and returning values. In addition, the conflict resolution function may be terminated at the computing instance once the d conflict resolution function returns values. In one aspect, the conflict is resolved by rejecting the mutation. The client may or may not be notified that the mutation was rejected. The data source may be a data store, search service, archive, or may be a code function that is a segment of program code executing on a code function service.

In another aspect, the conflict may be resolved using the conflict resolution function that is a segment of code function executing in a code function service that presents the values associated with the conflict message to the client and allows a selection of a value to write to the data source. Therefore, the client may be allowed to select how to resolve the conflict. Alternatively, the conflict may be resolved by ignoring the conflict message and applying the mutation to the data source.

After the conflict has been resolved, the mutation may be re-sent to the data source via a data access resolver associated with the data proxy for the mutation to be applied to the data source. The mutation, or a portion of the mutation, may be applied to a plurality of data sources after the conflict has been resolved. In one aspect, the data proxy may send a message about the mutation, after the mutation is written to the data source, to devices having a subscription associated with the mutation. The message may be sent using a messaging service and is sent to devices subscribed to a topic associated with the mutation. Therefore, the data proxy may be employed to update a data on a device in response to mutations applied to a data source. The topic to which a client subscribes may be created using a subscription field name and subscription arguments.

The client may create the mutation while the client is offline. The client may store the mutation while the client is offline. For example, the mutation may be optimistically cached with a plurality of mutations that are serially queued at a cache in the client. The mutation may then be sent to the data proxy after the client is online and reconnected with the data proxy.

In one aspect, a data schema is stored at the client and at the data proxy. The data proxy may store more than one version of the data schema. The mutation may be handled by the data proxy using a version of the data schema that is the same version of data schema employed by the client.

The data proxy may be employed to handle or manage permissions for queries and mutations sent from clients. For example, a per session identity and permission lists may be employed to manage multiple users accessing the data proxy wherein the multiple users access the data using different clients. The data proxy may have permission lists or cross account permissions that are stored in a pool. When the data proxy receives a query, mutation or other event from a device, the data proxy may check the permissions or pool to determine if the client, or user account, making the query is authorized to receive the results. The data proxy may deny the results based on the permissions or may scrub or block a portion of the results that the client is not authorized to receive.

Figure 8:
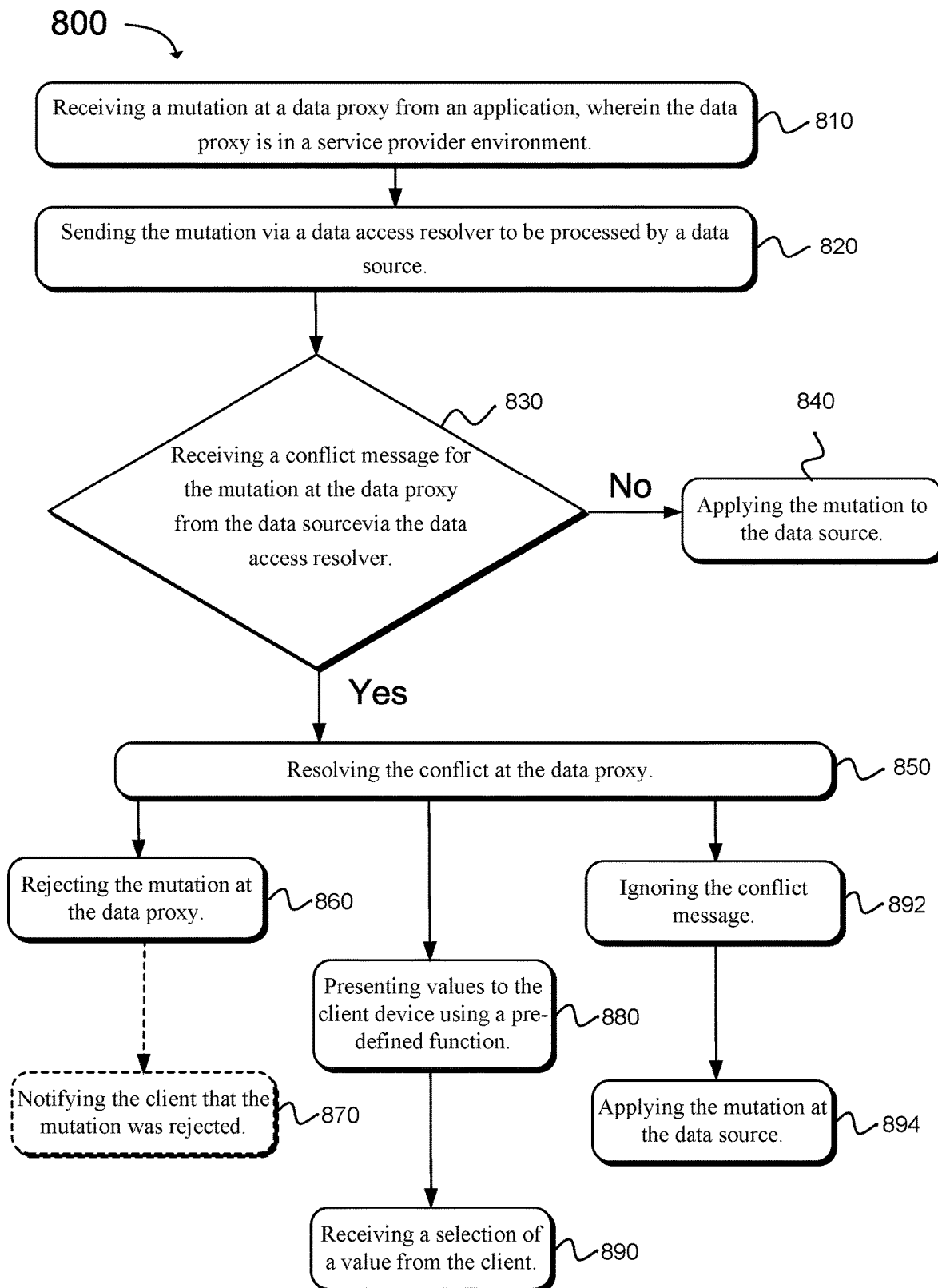

FIG. 8 is a flowchart of an example method 800 for resolving mutations at a data proxy according to an example of the present technology. The functionality 800 may be implemented as a method and executed as instructions on a machine, where the instructions are included on at least one computer readable medium or one non-transitory machine-readable storage medium. For example, starting in block 810, a mutation may be received at a data proxy from an application. The application may be executing at a client, and the mutation may be used to change data in a data source. The mutation may be sent, via a data access resolver, to be processed by a data source, as in block 820. The data source may be any type of data source and may in the public service provider environment or in a private network. A conflict message may be received for the mutation at the data proxy via the data access resolver, as in block 830. The conflict message may be from the data source. If the conflict message is not received, then the mutation is applied to the data source, as in block 840. If the conflict message is received, then the conflict is resolved by the data proxy, as in block 850. The data proxy may control resolution of the conflict.

The conflict may be resolved in more than one way. For example, the mutation may be rejected by the data proxy as in block 860. The data proxy may not notify the client that the mutation was rejected based on the conflict message. Alternatively, the data proxy may notify the client that that the mutation was rejected, as in block 870. The step represented by block 870 is depicted using a dotted line indicating the step is optional.

As an alternative path to block 860, values may be presented to the client using a conflict resolution function, as in block 880. The values may be options for the client to select how the conflict is to be resolved. For example, the client may elect not to enter the mutation, or the client may elect to change the mutation to resolve the conflict. The conflict resolution function may be a segment of a program code that this executed using a code function service. A selection of a value may be received from the client, as in block 890. The data proxy may be able to aggregate data from a plurality of different data sources and send messages to the clients from the plurality of different data sources. The plurality of different data sources may different types of data sources or may be a code function.

As an alternative path to either block 860 or block 880, the conflict message from the data source may be ignored by the data proxy, as in block 892. The mutation may then be applied to the data source, as in block 894. The mutation with the conflict message may be applied to the data source to overwrite the data in the data source to resolve the conflicting mutation.

Figure 9:
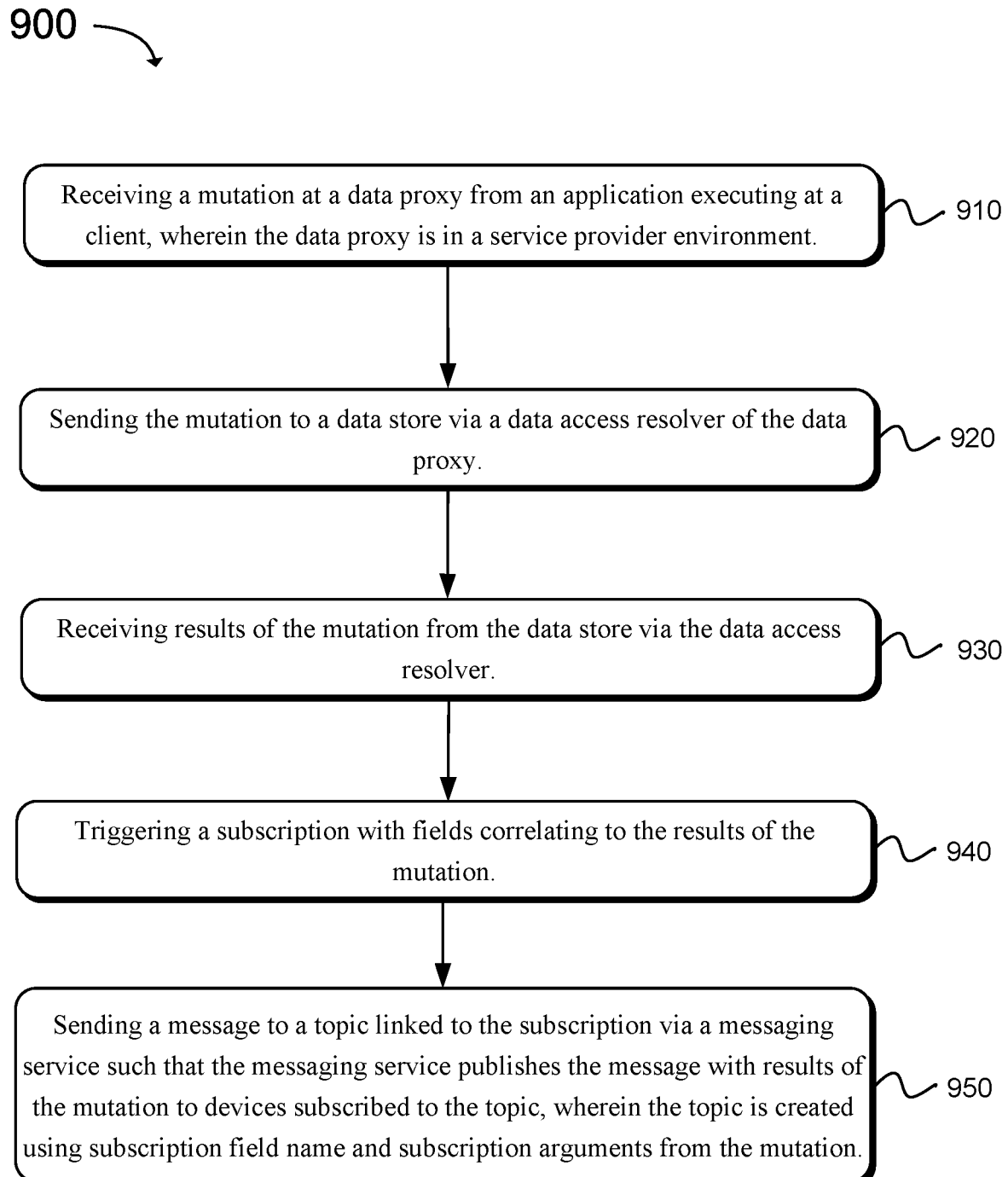
FIGS. 9-10 are flowcharts illustrating an example of a method for providing data feedback for a mutation according to an example of the present technology.

FIG. 9 is a flowchart of an example method 900 for providing immediate feedback for a mutation according to an example of the present technology. The functionality 900 may be implemented as a method and executed as instructions on a machine, where the instructions are included on at least one computer readable medium or one non-transitory machine-readable storage medium. For example, starting in block 910, a mutation may be received at a data proxy from an application executing at a client. The data proxy may be in a service provider environment.

The mutation may be sent to a data store via a data access resolver of the data proxy, as in block 920. Results of the mutation may be received from the data store via the data access resolver, as in block 930. A subscription may be triggered with fields correlating to the results of the mutation, as in block 940. A message may be sent to a topic linked to the subscription via a messaging service such that the messaging service publishes the message with results of the mutation to devices subscribed to the topic, as in block 950. The topic may be created using subscription field name and subscription arguments from the mutation. Therefore, the data proxy is able to provide feedback to clients in relation to the mutation being applied to the data store. The feedback may be provided immediately may be provided to any client subscribed to the topic associated with the subscription triggered by the mutation.

In one aspect, the message is sent using a messaging service that sends the message to the client using Message Queue Telemetry Transport (MQTT) protocol via publish-subscribe message service. Other messaging protocols may also be employed. The data proxy may manage cross account permissions to access data in the data store and manages results returned in response to queries or permutations from the client by removing fields from the results the client is not permitted access. In one aspect, the data proxy is employed to resolve conflicts between the mutation and the data store as is described in methods 600, 700, and 800 of FIGS. 6-8.

Figure 10:
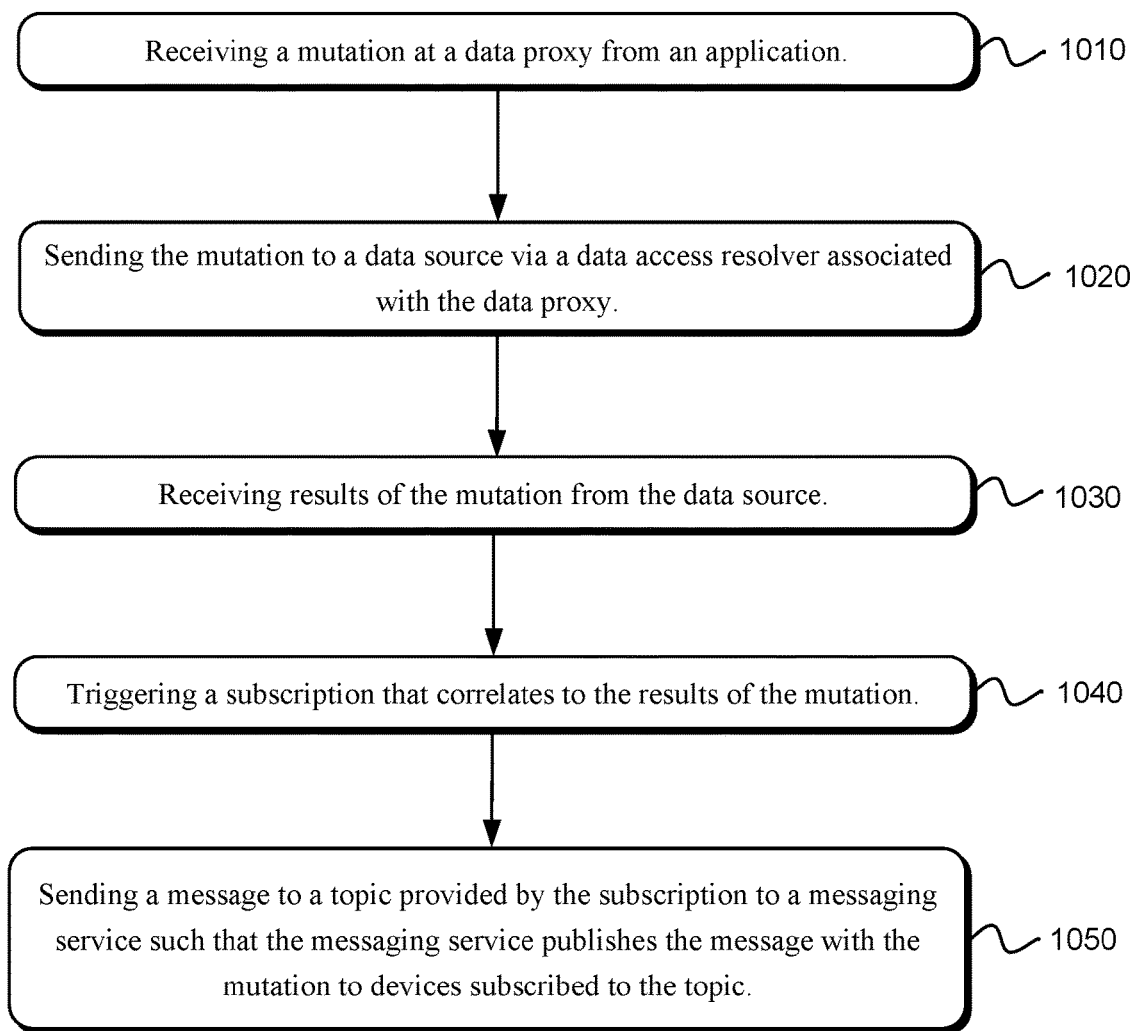

FIG. 10 is a flowchart of an example method 1000 for providing immediate feedback for a mutation according to an example of the present technology. The functionality 1000 may be implemented as a method and executed as instructions on a machine, where the instructions are included on at least one computer readable medium or one non-transitory machine-readable storage medium. For example, starting in block 1010, a mutation may be received at a data proxy from an application.

The mutation may be sent to a data source via a data access resolver associated with the data proxy, as in block 1020. The data source may be a data store such as an object data store, a key-value data store, an elastic store, a relational database such as an SQL database, and a search service. The data source may be a code function that is a segment of program code executing on a code function service. A portion of mutation might also be sent to a code function service. Results of the mutation may be received from the data source, as in block 1030. A subscription may be triggered that correlates to the results of the mutation, as in block 1040. A message may be sent to a topic in a messaging service which is linked to the subscription such that the messaging service publishes the message with the mutation to devices subscribed to the topic, as in block 1050. The topic may be created using subscription field name and subscription arguments. Therefore, the data proxy is able to provide feedback using published messages for mutations being applied to the data source. The feedback may be provided immediately and may be provided to any device subscribed to the topic associated with subscription linked to the mutation. The messages may be sent using a messaging service that is based on a publish-subscribe model where messages are sent via topics to devices that are subscribed to the topics.

In one aspect, the message is sent using the messaging service that sends the message to the client using Message Queue Telemetry Transport (MQTT) protocol. Other protocols may also be employed. The data proxy may manage cross account permissions to access data in the data source and manages results returned in response to queries or mutations from the client by removing fields from the results which the client is not permitted access. The data proxy may employ a per session identity to manage multiple users accessing the data proxy. In one aspect, the data proxy is employed to resolve conflicts between the mutation and the data source as is described in methods 600, 700, and 800 of FIGS. 6-8.

In one aspect, a data schema is stored at the client and at the data proxy. The data proxy may store more than one version of the data schema. The mutation may be handled by the data proxy using a version of the data schema that is the same version of data schema employed by the client.

Figure 11:
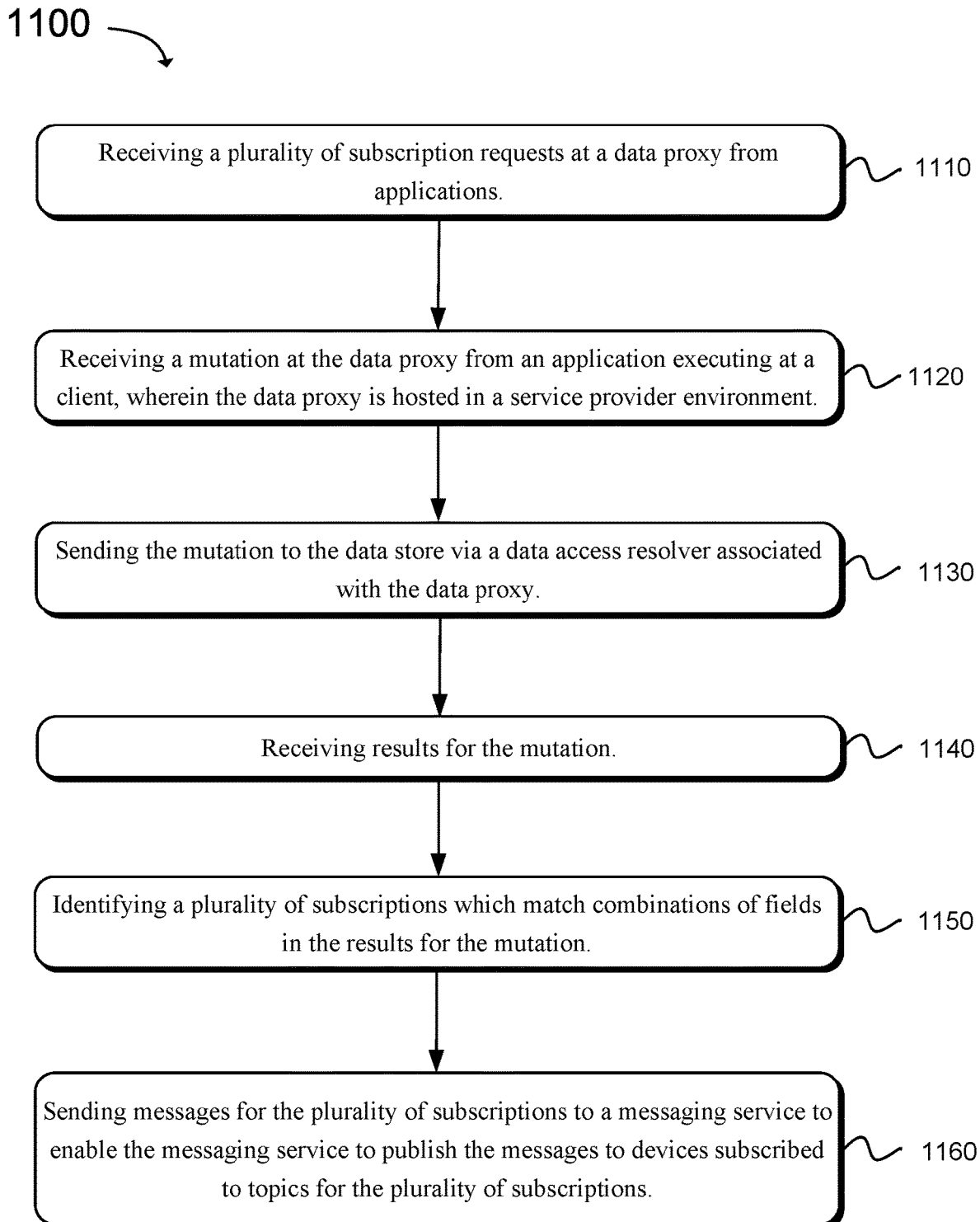
FIGS. 11-12 are flowcharts illustrating an example of a method of fan out for a subscription according to an example of the present technology.

FIG. 11 is a flowchart of an example method 1100 for fan out for subscriptions in response to a mutation according to an example of the present technology. The functionality 1100 may be implemented as a method and executed as instructions on a machine, where the instructions are included on at least one computer readable medium or one non-transitory machine-readable storage medium. For example, starting in block 1110, a plurality of subscription requests received from applications may be identified at a data proxy.

A mutation may be received at the data proxy from an application executing at a client, wherein the data proxy is hosted in a service provider environment, as in block 1120. The mutation may be sent to the data store via a data access resolver associated with the data proxy, as in block 1130. Results for the mutation may be received, as in block 1140.

A plurality of subscriptions may be identified which match combinations of fields in the results for the mutation, as in block 1150. A pre-defined function that is a segment of program code executing on a code function service may be used to identify the plurality of subscriptions which match the combinations of the fields in the results for the mutation. In one aspect, the number of combinations of fields in the results for the mutation is $2^N$ where N is the number of inputs representing fields from the results of the mutation.

Messages for the plurality of subscriptions may be sent to a messaging service to enable the messaging service to publish the messages to devices subscribed to topics for the plurality of subscriptions, as in block 1160. The messaging service may be based on a publish-subscribe model where devices subscribe to a topic and the messaging service may push out the messages to the subscribed devices. The topic may be created using at least one subscription field name and subscription arguments. Connection information may be sent to the client to enable the client to connect to and receive messages from a topic, and the connection information may include a topic identifier, a client identifier for connection to the service provider environment, and a pre signed Uniform Resource Locator (URL) that is scoped to topics that are subscribed to (only one client can connect using the pre-signed URL).

Figure 12:
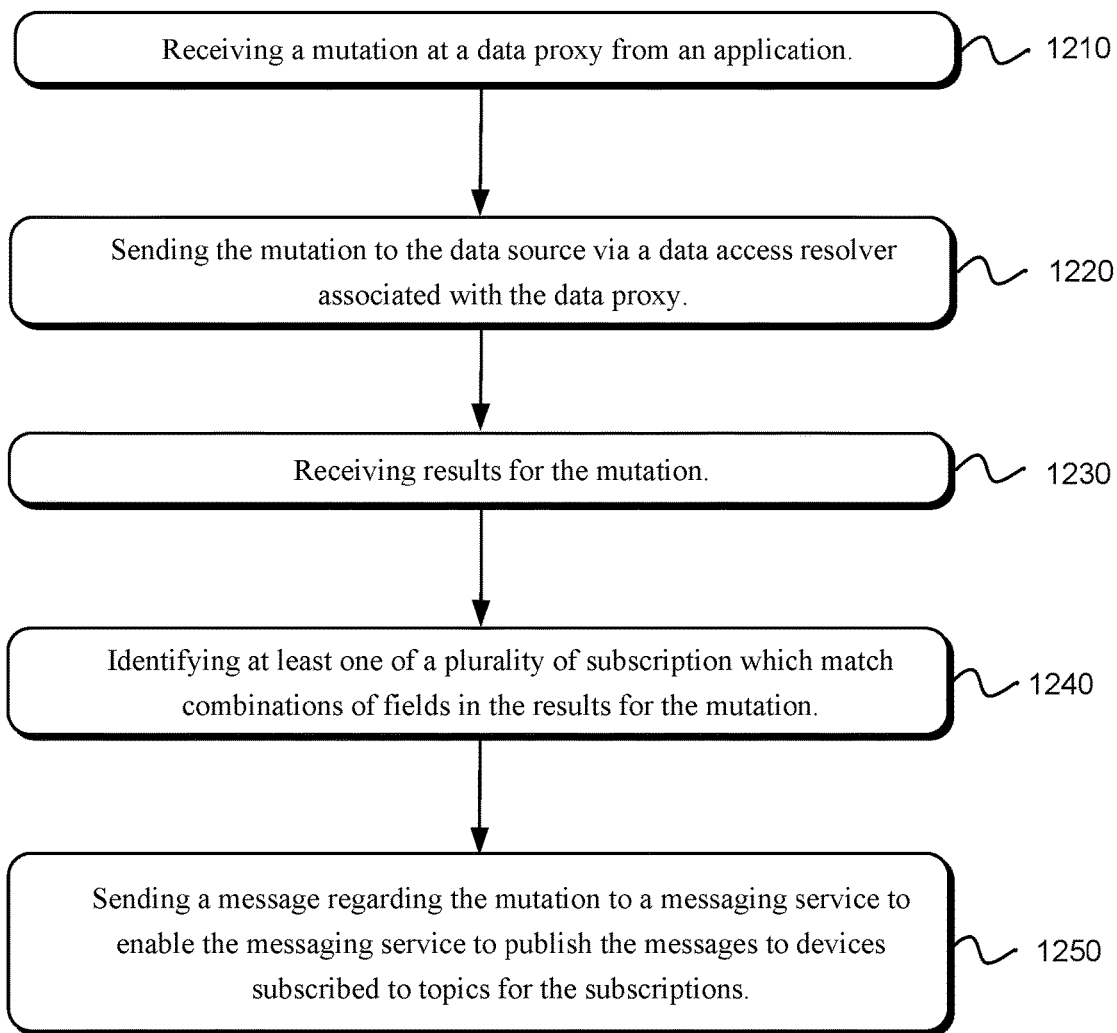

FIG. 12 is a flowchart of an example method 1200 for fan out for subscriptions according to an example of the present technology. The functionality 1200 may be implemented as a method and executed as instructions on a machine, where the instructions are included on at least one computer readable medium or one non-transitory machine-readable storage medium.

For example, as in block 1210, a mutation may be received at a data proxy from an application. The mutation may be sent to the data source via a data access resolver associated with the data proxy, as in block 1220. The data source may be a data store such as an object data store, a key-value data store, an elastic store, and a search service. The data source may be a code function that is a segment of program code executing on a code function service. In addition, a part of the mutation may be sent to a code function service. Results for the mutation may be received, as in block 1230.

At least one subscription may be identified which matches combinations of fields in the results for the mutation, as in block 1240. The data proxy may have received a plurality of subscription requests from a plurality of clients. Therefore, messaging for a plurality of subscriptions may be horizontally scalable by the data proxy using a plurality of subscriptions called in response to the mutation. A pre-defined function that is a segment of program code executing on a code function service may be used to identify the plurality of subscriptions which match the combinations of the fields in the results for the mutation. In one aspect, the number of combinations of fields in the results for the mutation is $2^N$ where N is the number of inputs representing fields in the results. A message regarding the mutation may be sent to a messaging service to enable the messaging service to publish the messages to devices subscribed to topics for the subscriptions, as in block 1250.

In one aspect, a data schema is stored at the client and at the data proxy. The data proxy may store more than one version of the data schema. The mutation may be handled by the data proxy using a version of the data schema that is the same version of data schema employed by the client.

FIG. 13 is a flowchart of an example method 1300 for synchronizing data with delayed subscription delivery according to an example of the present technology. The functionality 1300 may be implemented as a method and executed as instructions on a machine, where the instructions are included on at least one computer readable medium or one non-transitory machine-readable storage medium. For example, starting in block 1310, a network connection may be accepted from a client at a data proxy, and the client was previously connected to the data proxy. For example, the client may be online network state or connected to the data proxy and then the client may end up in an offline network state (e.g., disconnected from the internet). In a more specific example, the client may be a mobile device that moves into an area where the client is not able to receive reception for a wireless data connection. The client may then come back online and establish the network connection, which may include creating a web socket.

A request may be received at a data proxy for a data snapshot for an application that was offline at the client, wherein the data snapshot includes data generated by other applications or clients while the client was offline, as in block 1320. The data snapshot may include data that would have been sent to the client via a subscription if the device was online during the period the data was updated. A subscription for update data may be held for a pre-determined amount of time after the request for the snapshot, and data for the subscription is generated after the network connection has been made, as in block 1330. The subscription data may be held to allow the client time to receive the data snapshot and process the data snapshot so that the subscription data may be applied to the client after the snapshot data has been applied. The data snapshot may be sent to the client, as in block 1340. Data for the subscription may be sent after the pre-determined amount of time, as in block 1350. The pre-determined amount of time may be any amount of time. For example, the pre-determined amount of time may be 10 seconds or 30 seconds.

In one aspect, the data proxy tracks the time difference between the network connection and the request for the data snapshot and then bases the pre-determined amount of time on this time difference. For example, the pre-determined amount of time may be the time difference or may be the time difference plus an additional amount of time such as 5 or 10 seconds. Tracking the time difference and delaying or holding the subscription update data ensures that the client will be ready to receive the subscription update data after the client has reconnected to the data proxy. For example, the client may connect or reconnect to the data proxy but is not ready to receive subscription data. If such subscription data is sent to the client before the client is ready, the subscription data may be lost and not applied at the client.

In one aspect, after the network connection is accepted by the data proxy, the client may send a mutation to the data proxy. The mutation may be one of a plurality of mutations that were optimistically cached and serially ordered at the client while the client was offline. These mutations may be serially applied to the data stores, data sources, and data services.

In one aspect, after the pre-determined period of time has expired, the messaging system will resume sending messages to the client without delaying or holding the messages. The messaging system and the data proxy may send data to the client using a protocol such as Message Queue Telemetry Transport (MQTT) protocol.

FIG. 14 is a flowchart of an example method 1400 for synchronizing data with delayed subscription delivery according to an example of the present technology. The functionality 1400 may be implemented as a method and executed as instructions on a machine, where the instructions are included on at least one computer readable medium or one non-transitory machine-readable storage medium. For example, starting in block 1410, a request may be received at a data proxy for a data snapshot for an application that has been offline at the client. The data snapshot may include data that would have been sent to the client via a subscription if the device was online previously.

A subscription for update data may be held for a pre-determined amount of time after the request for the snapshot, as in block 1420. The subscription data may be held to allow the client time to receive the data snapshot and process the data snapshot so that the subscription data may be applied to the client after the snapshot data has been applied. The data snapshot may be sent to the client, as in block 1430. The data for the subscription may be sent to the client via an associated topic for a messaging service after the pre-determined amount of time, as in block 1440. The pre-determined amount of time may be any amount of time. For example, the pre-determined amount of time may be 10 seconds to 30 seconds.

In one aspect, the data proxy tracks the time difference between the network connection and the request for the data snapshot and then bases the pre-determined amount of time on this time difference. For example, the pre-determined amount of time may be the time difference or may be the time difference plus an additional amount of time such as 5 to 60 seconds.

In one aspect, after the network connection is accepted by the data proxy, the client may send a mutation to the data proxy. The mutation may be one of a plurality of mutations that were optimistically cached and serially ordered at the client while the client was offline. The mutation may be sent to the data source by the data proxy using a data access resolver. The data proxy may employ the messaging service to send a message regarding the mutation being applied to the data source. The data source may be a data store such an object data store, a key-value data store, or a search service. The data source may be a code function that is a segment of program code executing on a code function service. A portion of the mutation may also be sent to a code function service. The message may be sent to a device subscribed to a topic associated with the mutation. In one aspect, the data proxy is employed to resolve conflicts between the mutation and the data store as is described in methods 600, 700, and 800 of FIGS. 6-8.

In one aspect, a data schema is stored at the client and at the data proxy. The data proxy may store more than one version of the data schema. The mutation may be handled by the data proxy using a version of the data schema that is the same version of data schema employed by the client. In another aspect, after the pre-determined period of time has expired, the messaging system will resume sending messages to the client without delaying or holding the messages.

Figure 15:
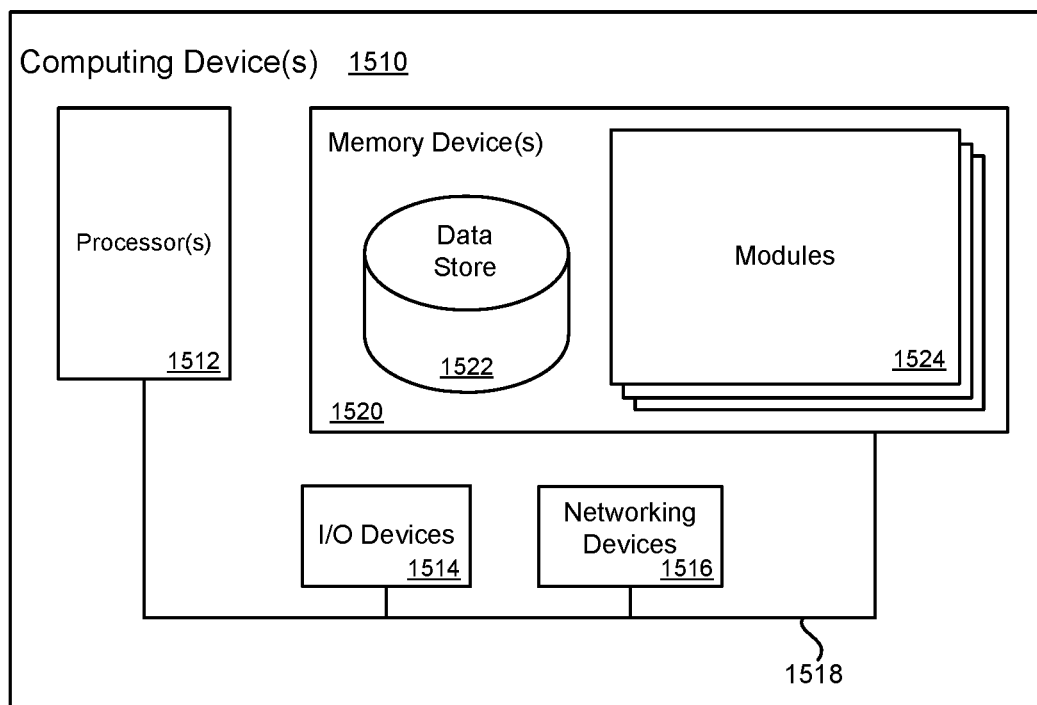
FIG. 15 is a block diagram that provides an example illustration of a computing device that may be employed in the present technology.

FIG. 15 illustrates a computing device 1510 on which modules of this technology may execute. A computing device 1510 is illustrated on which a high level example of the technology may be executed. The computing device 1510 may include one or more processors 1512 that are in communication with memory devices 1520. The computing device may include a local communication interface 1518 for the components in the computing device. For example, the local communication interface may be a local data bus and/or any related address or control busses as may be desired.

The memory device 1520 may contain modules that are executable by the processor(s) 1512 and data for the modules. Located in the memory device 1520 are modules 1524 executable by the processor. The modules may execute the functions described earlier. A data store 1522 may also be located in the memory device 1520 for storing data related to the modules and other applications along with an operating system that is executable by the processor(s) 1512.

Other applications may also be stored in the memory device 1520 and may be executable by the processor(s) 1512. Components or modules discussed in this description that may be implemented in the form of software using high programming level languages that are compiled, interpreted or executed using a hybrid of the methods.

The computing device may also have access to I/O (input/output) devices 1514 that are usable by the computing devices. An example of an I/O device is a display screen that is available to display output from the computing devices. Other known I/O device may be used with the computing device as desired. Networking devices 1516 and similar communication devices may be included in the computing device. The networking devices 1516 may be wired or wireless networking devices that connect to the internet, a LAN, WAN, or other computing network.

The components or modules that are shown as being stored in the memory device 1520 may be executed by the processor 1512. The term "executable" may mean a program file that is in a form that may be executed by a processor 1512. For example, a program in a higher level language may be compiled into machine code in a format that may be loaded into a random access portion of the memory device 1520 and executed by the processor 1512, or source code may be loaded by another executable program and interpreted to generate instructions in a random access portion of the memory to be executed by a processor. The executable program may be stored in any portion or component of the memory device 1520. For example, the memory device 1520 may be random access memory (RAM), read only memory (ROM), flash memory, a solid state drive, memory card, a hard drive, optical disk, floppy disk, magnetic tape, or any other memory components.

The processor 1512 may represent multiple processors and the memory 1520 may represent multiple memory units that operate in parallel to the processing circuits. This may provide parallel processing channels for the processes and data in the system. The local interface 1518 may be used as a network to facilitate communication between any of the multiple processors and multiple memories. The local interface 1518 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed cause a processor to perform processing, comprising:
   accepting, at a data proxy hosted by a service provider environment, a network connection from a client to enable the client to come online after the client has been offline for a period of time after having been previously connected to the data proxy;
   receiving, at the data proxy, a request from the client for a data snapshot for an application at the client, wherein the data snapshot includes data generated while the client was offline;
   holding a subscription for update data for a pre-determined amount of time after the request for the data snapshot, wherein the update data for the subscription is generated during the pre-determined amount of time that occurs after the request for the data snapshot;
   sending the data snapshot to the client; and
   sending the update data for the subscription to the client after the pre-determined amount of time.

2. The non-transitory machine readable storage medium of claim 1, further comprising:
   tracking a time difference between the network connection and the request for the data snapshot; and
   basing the pre-determined amount of time on the time difference between the network connection and the request for the data snapshot.

3. The non-transitory machine readable storage medium of claim 1, further comprising:
   receiving a mutation at the data proxy from the client, wherein the mutation is one of a plurality of mutations that were optimistically cached and serially ordered at the client while the client was offline.

4. The non-transitory machine readable storage medium of claim 1,
   wherein the data for the subscription is sent using at least one of: Message Queue Telemetry Transport (MQTT) protocol, WebSocket protocol, or long polling.

5. A method, comprising:
   receiving a request for a data snapshot for an application that has come online after the application has been offline for a period of time;
   holding a subscription for update data for a pre-determined amount of time after the request for the data snapshot, wherein the update data is generated during the pre-determined amount of time that occurs after the request for the data snapshot;
   sending the data snapshot to a client; and
   sending the update data for the subscription to the client via a messaging service after the pre-determined amount of time.

6. The method of claim 5, wherein the data snapshot includes data generated while the client was offline, and the update data for the subscription is generated after a network connection has been made.

7. The method of claim 5, wherein the pre-determined amount of time is at least 10 seconds.

8. The method of claim 5, further comprising:
   tracking a time difference between a network connection being completed and the request for the data snapshot; and
   basing the pre-determined amount of time on the time difference between the network connection being completed and the request for the data snapshot.

9. The method of claim 5, wherein the update data for the subscription is sent using at least one of: Message Queue Telemetry Transport (MQTT) protocol, WebSocket protocol, or long polling.

10. The method of claim 5, further comprising:
    receiving a mutation at a data proxy from the client; and
    applying the mutation to a data source via a data access resolver.

11. The method of claim 10, wherein the mutation is one of a plurality of mutations that were stored in a cache at the client in a queue while the client was offline and were sent to the data proxy to be applied serially after a network connection is made.

12. The method of claim 10, wherein the data proxy includes more than one version of a data schema and the mutation is handled by the data proxy using a version of the data schema employed by the client.

13. The method of claim 10, further comprising:
    receiving a conflict notification at the data proxy from the data access resolver for a conflict associated with the mutation at the data source; and
    resolving the conflict at the data proxy using a pre-defined function defined in the data proxy.

14. The method of claim 10, wherein the data source is a data store, and the data store comprises one of: an object data store, a key-value data store, a relational database, or a search service.

15. The method of claim 10, wherein the data source is a code function that is a segment of program code executing on a code function service.

16. The method of claim 5, wherein a messaging service is used to deliver messages to the client and the messaging service is based on a publish-subscribe model, wherein messages are sent to topics subscribed to by the client.

17. A system, comprising:
    a data proxy;
    at least one processor; and
    a memory device including instructions to be executed by the at least one processor in order to:
       accept, at a data proxy, a network connection from a client to enable the client to come online after the client has been offline for a period of time;
       receive, at the data proxy, a request for a data snapshot for an application that has been offline;
       hold a subscription for update data for a pre-determined amount of time after the request for the data snapshot, wherein the update data is generated during the pre-determined amount of time that occurs after the request for the data snapshot;
       send the data snapshot to the client;
       send the update data for the subscription after the pre-determined amount of time; and
       receive a mutation from a queue for the client, wherein the mutation was generated at the client while the client was offline.

18. The system of claim 17, the memory device including further instructions to be executed by the at least one processor in order to:
    track a time difference between the network connection and the request for the data snapshot; and
    base the pre-determined amount of time on the time difference between the network connection and the request for the data snapshot.

19. The system of claim 17, wherein the mutation is one of a plurality of mutations that were optimistically cached and serially ordered at the client while the client was offline.

20. The system of claim 17, the memory device including further instructions to be executed by the at least one processor in order to:
    apply a plurality of mutations from the client in a serial order that was generated at the client.

* * * * *